United States Patent [19]
Ohtaka et al.

[11] Patent Number: 6,088,537
[45] Date of Patent: Jul. 11, 2000

[54] FOCUS DETECTING DEVICE

[75] Inventors: Keiji Ohtaka; Yusuke Ohmura, both of Yokohama, Japan

[73] Assignee: Canon Kabushiki Kaisha, Tokyo, Japan

[21] Appl. No.: 09/059,218

[22] Filed: Apr. 13, 1998

[30] Foreign Application Priority Data

Apr. 15, 1997 [JP] Japan ................................. 9-097291
Apr. 30, 1997 [JP] Japan ................................. 9-126334

[51] Int. Cl.$^7$ .................................................. G03B 17/00

[52] U.S. Cl. ........................................... 396/81; 396/93

[58] Field of Search ................................ 396/80, 82, 81, 396/93, 91, 92, 121, 122, 123

[56] References Cited

U.S. PATENT DOCUMENTS 4,843,415  6/1989  Matsui et al. ............................ 396/91
5,347,340  9/1994  Tsukada .................................. 396/93

Primary Examiner—W. B. Perkey
Attorney, Agent, or Firm—Robin, Blecker & Daley

[57] ABSTRACT

A focus detecting device of the kind using an area sensor which has a plurality of focus detecting areas necessitates setting a correction value for every one of the focus detecting areas and storing all the correction values thus obtained, whereas, according to the invention, the correction value for each of the focus detecting areas of the area sensor is obtained by an arithmetic operation using, as variables, two parameters indicative of the position of the area, so that a focus detecting device can be arranged to obviate the necessity of storing all the correction values for the respective focus detecting areas.

38 Claims, 18 Drawing Sheets

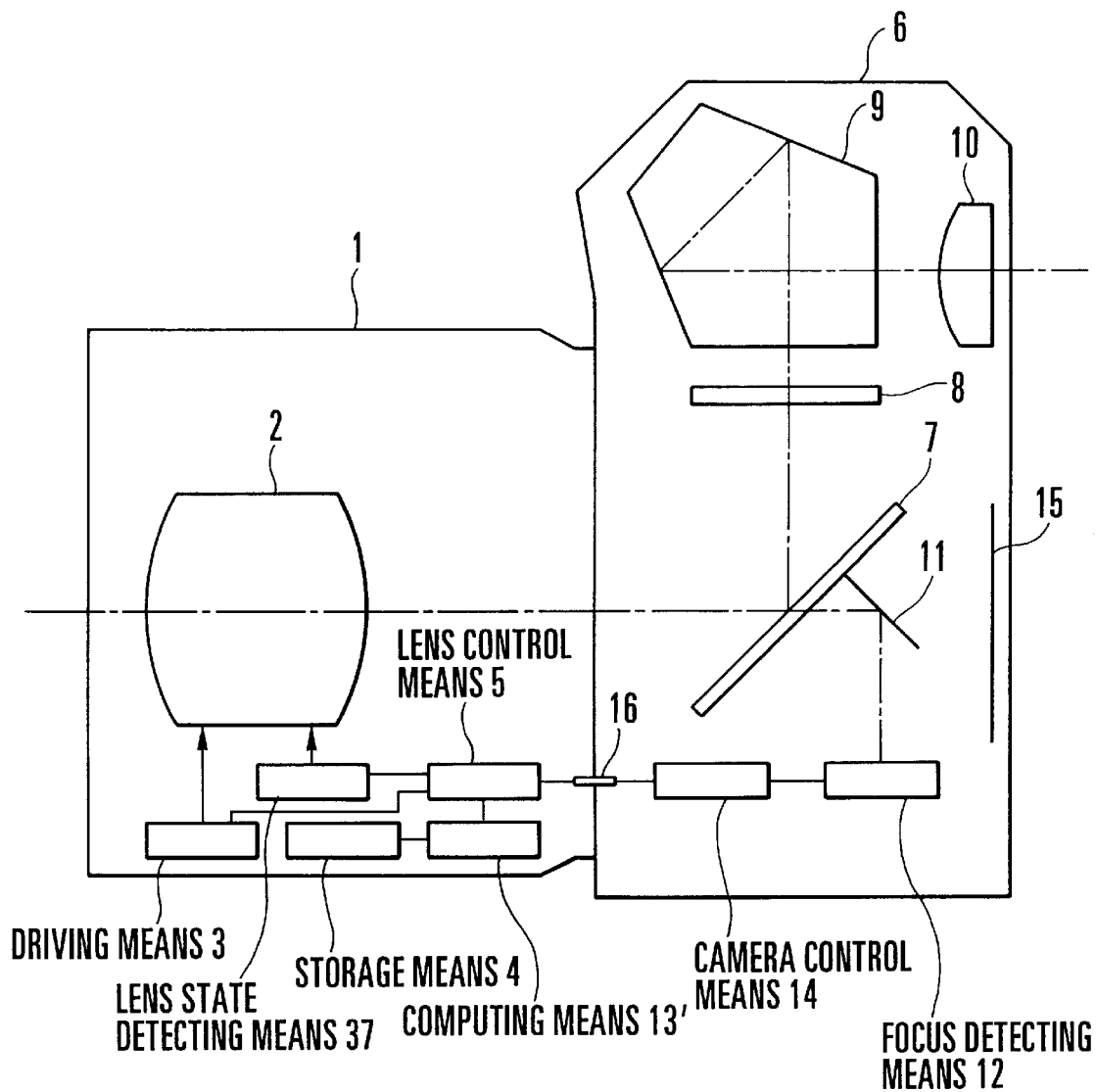

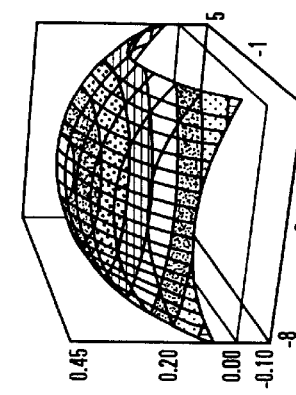
FIG. 19(A)(i)
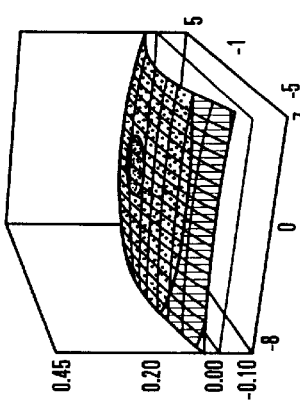
FIG. 19(A)(ii)
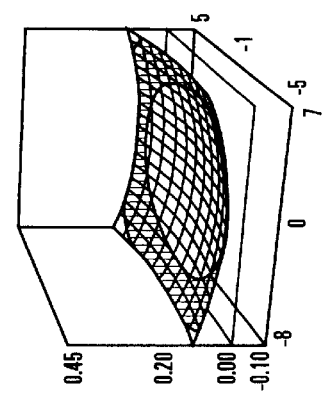
FIG. 19(A)(iii)
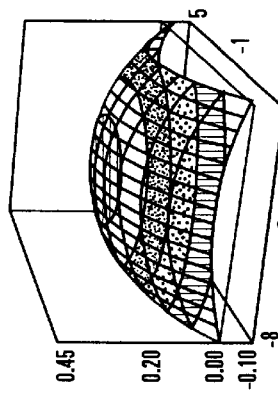
FIG. 19(B)(i)
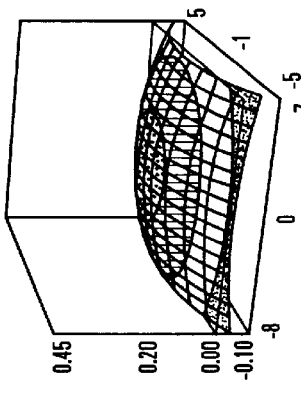
FIG. 19(B)(ii)
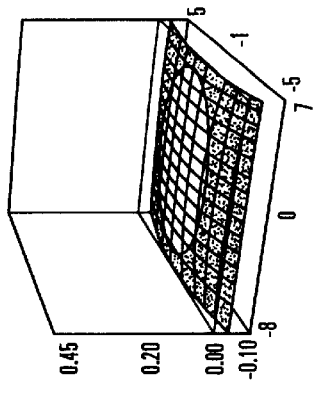
FIG. 19(B)(iii)
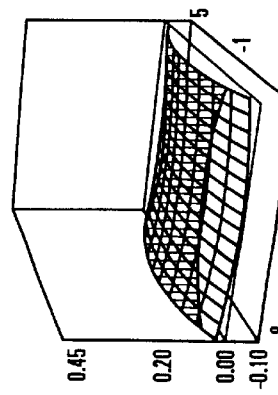
FIG. 19(C)(i)
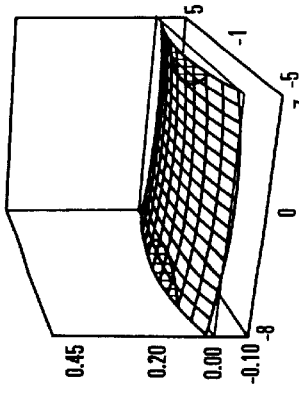
FIG. 19(C)(ii)
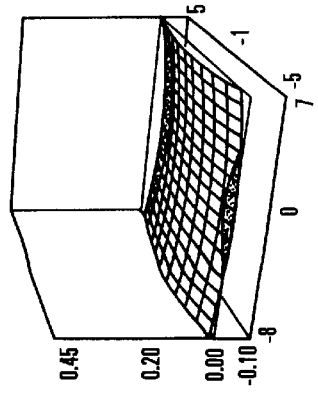
FIG. 19(C)(iii)

FOCUS DETECTING DEVICE

BACKGROUND OF THE INVENTION

1. Field of the Invention

The present invention relates to a focus detection system for image pickup apparatuses such as cameras, video cameras, etc., or for observation apparatuses of various kinds, and more particularly to a focus detecting device capable of detecting focus two-dimensionally and continuously over a wide range on a photo-taking image plane or observation image plane.

2. Description of Related Art

FIG. 8 shows a conventional camera having a built-in focus detecting device. The camera shown in FIG. 8 includes an objective lens 101 which is provided for photo-taking, a main mirror 102 which is semi-transparent, a focusing screen 103, a pentagonal prism 104, an eyepiece 105, a sub-mirror 106, a film 107, and a focus detecting device 108.

Referring to FIG. 8, a light flux from an object (not shown), after passing through the objective lens 101, is reflected upward by the main mirror 102 to form an image on the focusing screen 103. The image formed on the focusing screen 103 is reflected a plurality of times by the pentagonal prism 104 and is then viewed through the eyepiece 105 by a camera operator or an observer.

A part of the light flux which reaches the main mirror 102 from the objective lens 101 passes through the semi-transparent main mirror 102 and is then reflected downward by the sub-mirror 106 to be guided to the focus detecting device 108.

FIG. 9 is a diagram for explaining the operating principle of the focus detecting device by showing, in development view, essential parts of the objective lens 101 and the focus detecting device 108 shown in FIG. 8.

Referring to FIG. 9, the focus detecting device 108 includes a field mask 109 which is disposed near to a predetermined focal plane of the objective lens 101, i.e., a plane conjugate to a film surface, a field lens 110 which is disposed also near to the predetermined focal plane, a secondary image forming system 111 which is composed of two lenses 111-1 and 111-2, a photoelectric conversion element 112 which is composed of two sensor arrays 112-1 and 112-2 disposed respectively behind the two lenses 111-1 and 111-2, and a diaphragm 113 which has two aperture parts 113-1 and 113-2 disposed respectively correspondingly with the two lenses 111-1 and 111-2. Reference numeral 114 denotes an exit pupil of the objective lens 101 including two divided areas 114-1 and 114-2.

The field lens 110 is arranged to form images of the aperture parts 113-1 and 113-2 respectively in the neighborhood of the areas 114-1 and 114-2 of the exit pupil 114 of the objective lens 101. The quantities of light of light fluxes 115-1 and 115-2 having passed through the areas 114-1 and 114-2 are thus distributed respectively to the two sensor arrays 112-1 and 112-2.

The focus detecting principle of the focus detecting device shown in FIG. 9 is generally called a phase-difference detecting method. According to this method, the light-quantity distributions respectively obtained on the two sensor arrays 112-1 and 112-2 come near to each other when the image forming point of the objective lens 101 is in front of the predetermined focal plane, i.e., on the side of the objective lens 101, and come away from each other when the image forming point of the objective lens 101 is in rear of the predetermined focal plane, i.e., on the side opposite to the objective lens 101. Besides, the amount of discrepancy between the light-quantity distributions obtained on the two sensor arrays 112-1 and 112-2 is in a functional relation to the amount of defocus, i.e., the amount of focus deviation, of the objective lens 101. Therefore, the amount of defocus and the direction of defocus of the objective lens 101 can be detected by computing the amount of discrepancy with a suitable computing means.

The focus detecting device shown in FIG. 9 is capable of detecting focus only for an object in one area located in the central part of an observing range or a photo-taking range of the objective lens 101. In view of this, a focus detecting device has been developed to be capable of detecting focus not only for the central area but also for an object located outside of the central area of the observing or photo-taking range.

FIG. 10 shows the arrangement of an optical system of the above-stated focus detecting device. In FIG. 10, reference numeral 116 denotes a field mask. The filed mask 116 has a cross-shaped aperture part 116-1 formed in the middle part thereof and vertical oblong aperture parts 116-2 and 116-3 formed in its peripheral part on both sides of the cross-shaped aperture part 116-1.

A field lens 117 is composed of three parts (areas) 117-1, 117-2 and 117-3 which correspond respectively to the three aperture parts 116-1, 116-2 and 116-3. A diaphragm 118 is provided with a middle aperture part 118-1 and peripheral aperture parts 118-2 and 118-3. The middle aperture part 118-1 includes four apertures 118-1$a$, 118-1$b$, 118-1$c$ and 118-1$d$ which are arranged in vertical and transverse pairs. The peripheral aperture part 118-2 includes a pair of apertures 118-2$a$ and 118-2$b$ and the peripheral aperture part 118-3 includes a pair of apertures 118-3$a$ and 118-3$b$. The areas 117-1, 117-2 and 117-3 of the field lens 117 are arranged respectively to form images of the aperture parts 118-1, 118-2 and 118-3 in the neighborhood of the exit pupil of an objective lens (not shown). An optical member 119 is a secondary image forming system which is integrally formed with four pairs of lenses, i.e., eight lenses, 119-1$a$, 119-1$b$, 119-1$c$, 119-1$d$, 119-2$a$, 119-2$b$, 119-3$a$ and 119-3$b$, disposed respectively in rear of the corresponding apertures of the diaphragm 118. A photoelectric conversion element 120 is composed of four pairs of, i.e., a total of eight, sensor arrays 120-1$a$, 120-1$b$, 120-1$c$, 120-1$d$, 120-2$a$, 120-2$b$, 120-3$a$ and 120-3$b$, which are arranged to receive images from the corresponding lenses of the secondary image forming system.

FIG. 11 shows the manner of images which are formed on the photoelectric conversion element 120. Referring to FIG. 11, light fluxes having passed through the middle aperture part 116-1 of the field mask 116 and the middle part 117-$a$ of the field lens 117 are respectively restricted by the apertures 118-1$a$, 118-1$b$, 118-1$c$ and 118-1$d$ of the diaphragm 118 and, after that, are respectively imaged on image areas 121-1$a$, 121-1$b$, 121-1$c$ and 121-1$d$ of the photoelectric conversion element 120 by the lenses 119-1$a$, 119-1$b$, 119-1$c$ and 119-1$d$ of the secondary image forming system 119 disposed behind the diaphragm 118. Light fluxes having passed through the peripheral aperture part 116-2 of the field mask 116 and the peripheral part 117-2 of the field lens 117 are restricted by the apertures 118-2$a$ and 118-2$b$ of the diaphragm 118 and, after that, are imaged on image areas 121-2$a$ and 121-2$b$ of the photoelectric conversion element 120 by the lenses 119-2$a$ and 119-2$b$ of the secondary image forming system 119 disposed behind the diaphragm 118. Light fluxes having passed through the peripheral aperture part 116-3 of the field mask 116 and the peripheral part 117-3 of the field lens 117 are likewise restricted by the apertures 118-3a and 118-3b of the diaphragm 118 and, after that, are imaged on image areas 121-3a and 121-3b of the photoelectric conversion element 120 by the lenses 119-3a and 119-3b of the secondary image forming system 119 disposed behind the diaphragm 118.

The focus detecting principle of the focus detecting device shown in FIG. 10 is similar to that shown in FIG. 9. Focus is detected by detecting the relative positions of images obtained in the direction of arrays of paired sensors. According to the arrangement shown in FIG. 10, focus can be detected not only for an object located in the central area of the observing or photo-taking range but also for objects located in positions corresponding to the peripheral aperture parts 116-2 and 116-3 of the field mask 116. Further, the above-stated arrangement enables the focus detecting device to detect focus even when a light-quantity distribution of a photo-taking or observing object varies only in one vertical or lateral direction in the central area of the observing or photo-taking range.

With each of the above-stated focus detecting devices used for a camera having an interchangeable lens, such as a single-lens reflex camera, it is sometimes impossible to correctly detect a focusing state, if the lens is controlled on the basis of a focusing-state detecting signal related to an amount of focus deviation directly obtained. A main reason for this problem lies in that a light flux of the objective lens forming an observing or photo-taking image generally differs from a light flux taken in by the focus detecting device.

Another reason lies in that the focus detecting device of the phase difference detecting type is arranged to detect a focus position, i.e., a focus deviation amount, by converting it into an image discrepancy with respect to a lateral aberration, while the focus deviation amount should be determined with respect to the amount of longitudinal aberration, i.e., an aberration in the direction of an optical axis. Therefore, in a case where the objective lens has some aberration, there arises a difference between the light flux of the objective lens and the light flux taken in by the focus detecting device according to how the aberration is corrected.

To solve these problems, a lens control method has been developed to carry out lens control on the basis of a corrected focus detection signal Dc obtained by some correction means. The correction means is arranged to correct a focus detecting signal D indicative of the amount of focus deviation by using a correction value C decided for each individual objective lens, so as to obtain the corrected focus detection signal Dc, for example, as expressed below:

$$Dc=D-C \quad (1).$$

The correction value C for each individual lens generally varies according to the position of a focus detecting area of the focus detecting device. Therefore, in a case where there are focus detecting areas besides the central focus detecting area as shown in FIG. 10, the focus detecting device must be provided with correction values for all of these focus detecting areas. However, in a case where use of many focus detecting areas is anticipated, the above-stated lens control method necessitates a large storage capacity either on the side of the objective lens or on the side of the camera body for storing many correction values for all the focus detecting areas.

In cases where the aberration of an objective lens greatly varies as a result of a change of the position (a focusing object distance) of a focusing lens within the objective lens, or a change of a focal length of a zoom lens or a change of aperture of a diaphragm in taking a shot, many correction values must be kept in store to cover the moving states of the lens for focusing or zooming and the aperture positions of the diaphragm. Such requirements necessitate a further increase in storage capacity. The increase in storage capacity can be suppressed to some degree by limiting the number of divisions of correction values for each of such states. However, that method is undesirable because the storage capacity is suppressed at the expense of precision of the correction.

Further, in the case of a photo-taking system already arranged to act only for predetermined positions or a predetermined number of focus detecting areas, such as a single-lens reflex camera, an interchangeable lens or the like, a new camera having a focus detecting device arranged to have different positions and a different number of focus detecting areas does not adequately operate in that system.

A method for solving these problems was disclosed in Japanese Laid-Open Patent Application No. HEI 6-331886. According to this method, the correction value C is assumed to be dependent only on a distance e from the center of the focus detecting area and a change in the correction value C is assumed to be expressible by a function related to the distance l. Correction values for at least two focus detecting areas in specific positions are used as they are. The correction values for focus detecting areas in other positions are, on the other hand, obtained through a correcting process carried out with a function of a linear or quadratic expression.

BRIEF SUMMARY OF THE INVENTION

In accordance with an aspect of the invention, there is provided a focus detecting device for detecting a focusing state according to an output and a correction value of a predetermined area in a sensor part having light receiving areas arranged on a two-dimensional base for receiving a light flux having passed through an objective lens, wherein the correction value for the predetermined area of the sensor part is computed by using, as variables for computation, two parameters indicative of a position of the predetermined area, so that the correction value can be obtained without storing correction values for all of the light receiving areas.

In accordance with another aspect of the invention, there is provided a focus detecting device, wherein, in obtaining correction values for a plurality of areas of the sensor part, the correction value for each area is computed by using, as variables for computation, parameters indicative of the position of each area.

In accordance with a further aspect of the invention, there is provided a focus detecting device, wherein, in obtaining the correction value, data indicative of coordinates of the position of each area in the sensor part are used as the parameters.

In accordance with a further aspect of the invention, there is provided a focus detecting device, which comprises focus detecting means for obtaining a signal related to a focusing state of an objective lens for each of a plurality of areas on a prescribed focal plane of the objective lens, storage means for storing an intrinsic constant indicative of an intrinsic characteristic of the objective lens, lens state detecting means for detecting a state of the objective lens, state constant computing means for computing a state constant which corresponds to the state of the objective lens by using the intrinsic constant and a first computing procedure which includes a first parameter obtained by the lens state detecting means, correction value computing means for obtaining a signal related to correction to be made in detecting focus on each of the areas by using the state constant and a second computing procedure which includes a second parameter set for each area of the prescribed focal plane, and correction computing means for computing the focusing state of the objective lens on the basis of the signal related to the focusing state and the signal related to the correction. The focus detecting device arranged in this manner obviates the necessity of storing many correction data for covering various states of the objective lens.

In accordance with a still further aspect of the invention, there is provided a focus detecting device, wherein the lens state detecting means is arranged to detect a moving state of a moving lens included in the objective lens or an amount characterizing the moving state of the moving lens, so that a process is carried out according to a change in focal length or a change in focusing distance of the objective lens.

The above and further aspects and features of the invention will become apparent from the following detailed description of embodiments thereof taken in connection with the accompanying drawings.

BRIEF DESCRIPTION OF THE SEVERAL VIEWS OF THE DRAWING

FIG. 15 shows the arrangement of a camera system equipped with a focus detecting device according to a fourth embodiment of the invention.

FIGS. 19(A)(i) to 19(A)(iii), 19(B)(i) to 19(B)(iii) and 19(C)(i) to 19(C)(iii) show correction values obtained in the seventh embodiment.

DETAILED DESCRIPTION OF THE INVENTION

Hereinafter, preferred embodiments of the invention will be described in detail with reference to the drawings.

Figure 1:
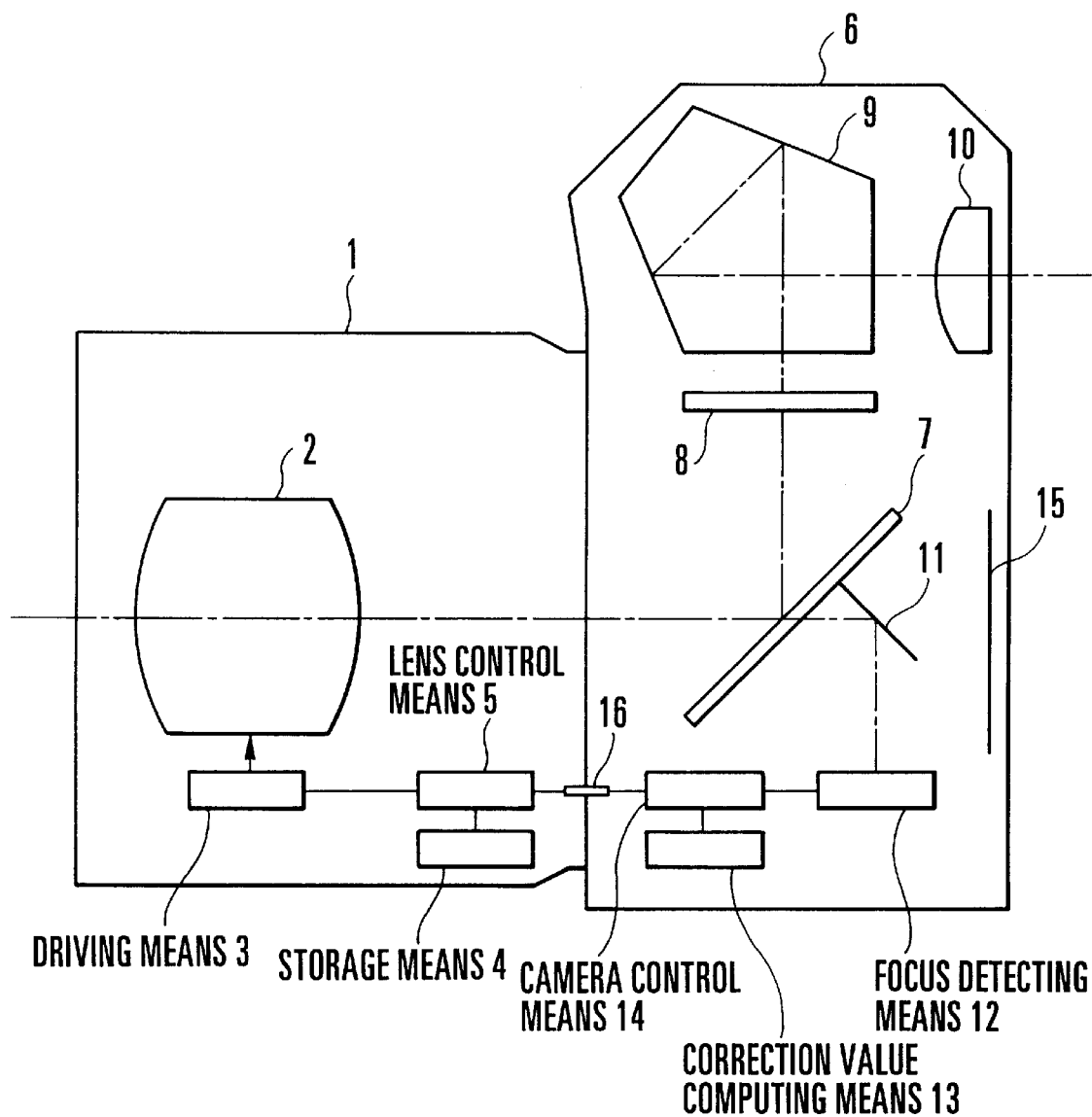
FIG. 1 shows the arrangement of a camera system equipped with a focus detecting device according to a first embodiment of the invention.

FIG. 1 shows the arrangement of a camera system equipped with a focus detecting device according to a first embodiment of the invention. Referring to FIG. 1, a photo-taking lens 1, which is an objective lens, contains therein a photo-taking optical system 2, a driving means 3 arranged to adjust the focusing state of the photo-taking lens 1 by moving some of or all of the lenses constituting the photo-taking optical system 2, a storage means 4 which is a ROM or the like, and a lens control means 5 arranged to control all of the parts of the photo-taking lens 1. On the other hand, a camera body 6 contains therein a main mirror 7, a focusing screen 8, a pentagonal prism 9 and an eyepiece 10, which constitute a viewfinder system. The camera body 6 further contains therein a sub-mirror 11, a focus detecting means 12, a correction value computing means 13, a camera control means 14, and a film 15 which is used as a photo-taking medium. The photo-taking lens 1 and the camera body 6 are provided with contacts 16. When the photo-taking lens 1 and the camera body 6 are coupled with each other, electric power is supplied and information is communicated between them through the contacts 16.

Figure 2:
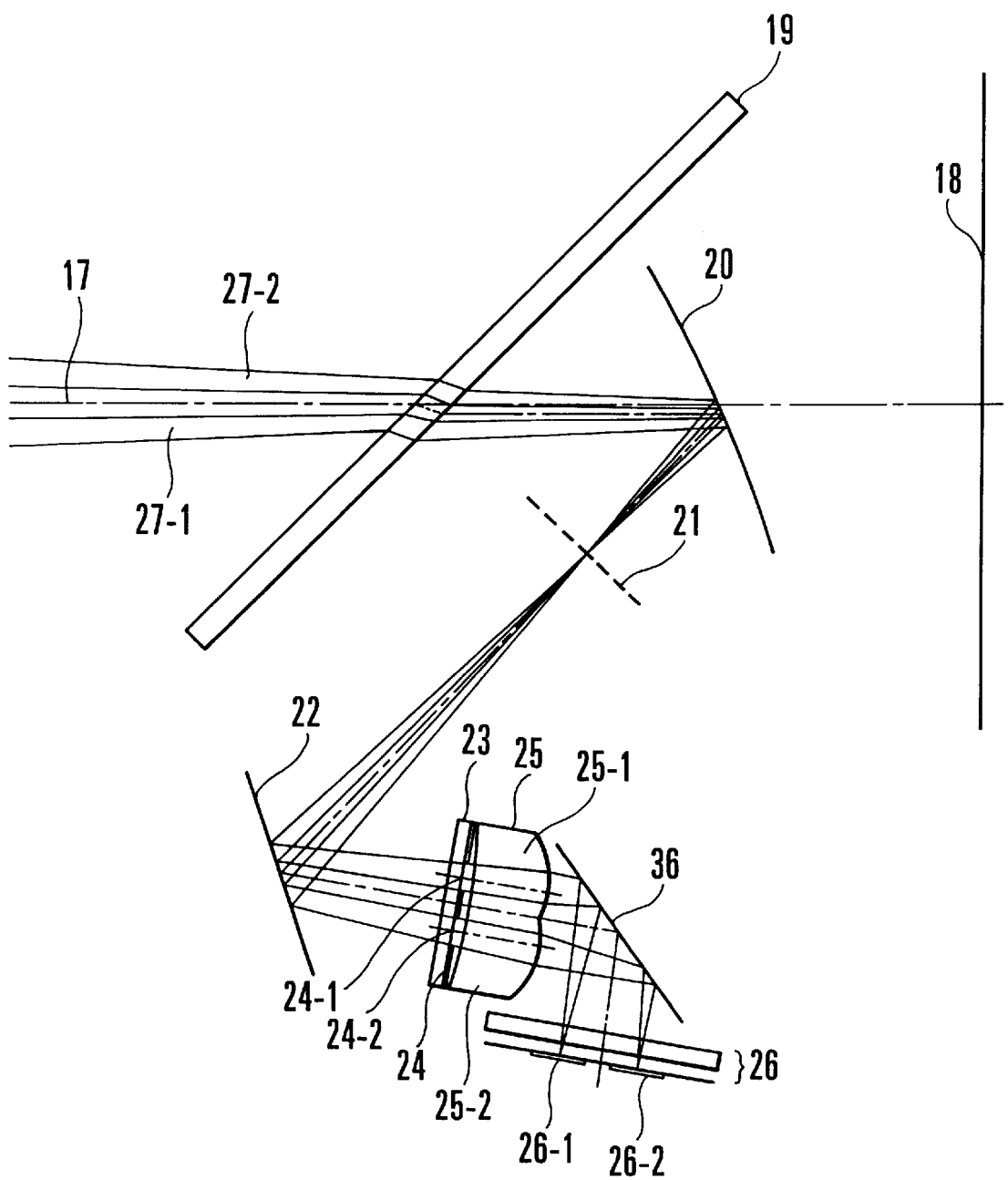
FIG. 2 shows the optical arrangement of a focus detecting means in the first embodiment.

FIG. 2 shows in detail the optical arrangement of the focus detecting means 12. In FIG. 2, reference numeral 17 denotes the optical axis of the photo-taking lens, i.e., an objective lens, which is not shown. Reference numeral 18 denotes a film which is equivalent to the film 15 shown in FIG. 1. Reference numeral 19 denotes a semi-transparent main mirror disposed on the optical axis 17 of the photo-taking lens, which is equivalent to the main mirror 7 shown in FIG. 1. Reference numeral 20 denotes a first reflection mirror which is obliquely arranged on the optical axis 17 of the objective lens to perform the same function as the sub-mirror 11 of FIG. 1. Reference numeral 21 denotes a paraxial image forming plane which is conjugate to the film 18 for paraxial image forming by the first reflection mirror 20. Reference numeral 22 denotes a second reflection mirror. Reference numeral 23 denotes an infrared cut filter. Reference numeral 24 denotes a diaphragm having two apertures 24-1 and 24-2. Reference numeral 25 denotes a secondary image forming system having two lenses 25-1 and 25-2 which correspond to the two apertures 24-1 and 24-2. Reference numeral 36 denotes a third reflection mirror. Reference numeral 26 denotes a photoelectric conversion element having two area sensors 26-1 and 26-2. The first reflection mirror 20 has curvature to have a convergent power for projecting the images of the two apertures 24-1 and 24-2 of the diaphragm 24 on parts in the neighborhood of the exit pupil of the photo-taking (objective) lens which is not shown. Further, the first reflection mirror 20 is coated by vapor deposition with a metal film of aluminum, silver or the like in such a way as to reflect light only from necessary areas and is thus arranged to perform also the function as a field mask which limits a range within which a focus detecting action is performed. The other reflection mirrors 22 and 36 have only minimum necessary areas of them coated by vapor deposition with a metal film for the purpose of lessening any stray light incident on the photoelectric conversion element 26. A coating material having a light absorbing property may be applied to the areas of each of these reflection mirrors not acting as reflection surfaces.

Figure 3:
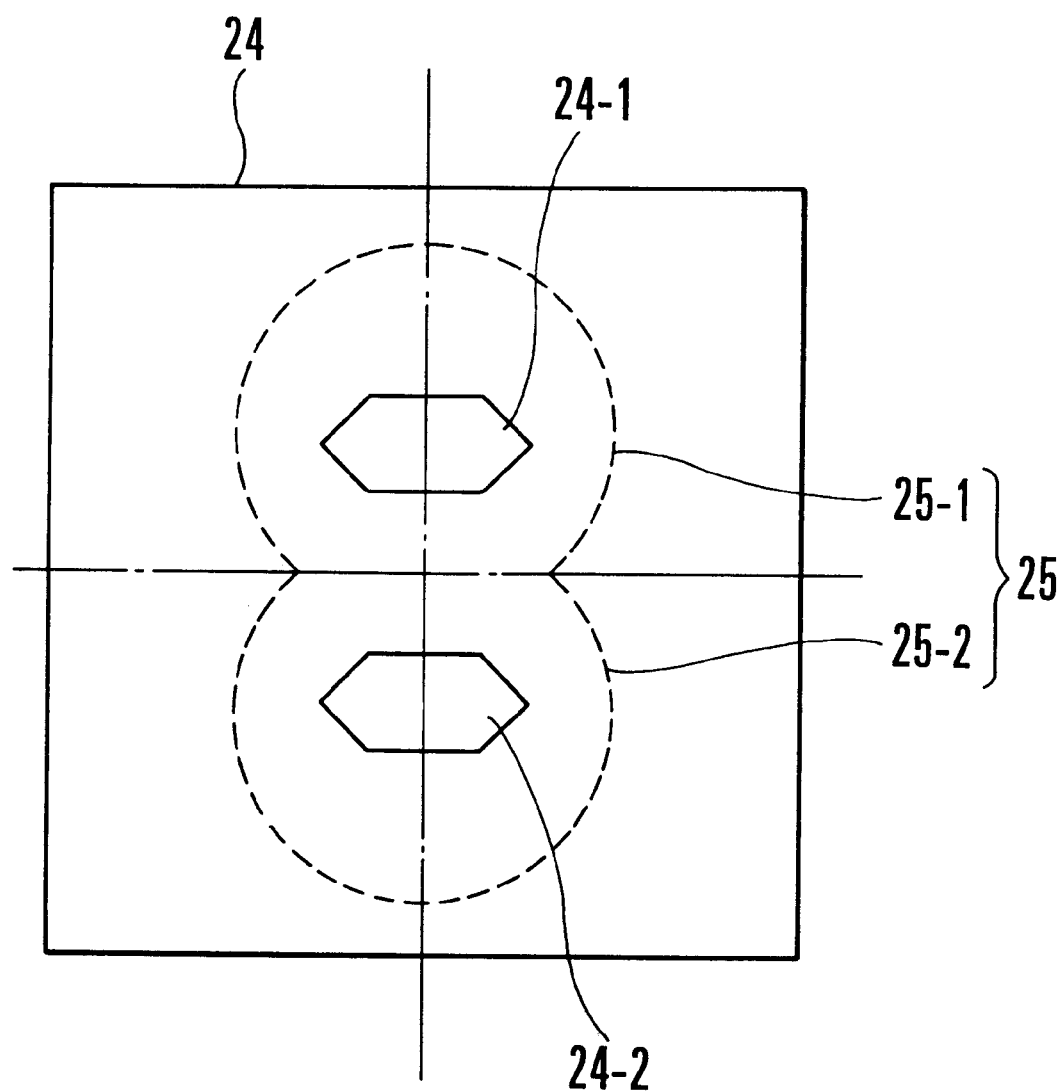
FIG. 3 shows the arrangement of a diaphragm of the focus detecting means in the first embodiment.

FIG. 3 is a plan view showing the diaphragm 24. The two apertures 24-1 and 24-2 which laterally extend are aligned in the direction of their narrower widths. In FIG. 3, broken lines indicate the lenses 25-1 and 25-2 of the secondary image forming system 25, which are disposed behind the diaphragm 24 in positions corresponding to the apertures 24-1 and 24-2 of the diaphragm 24.

Figure 4:
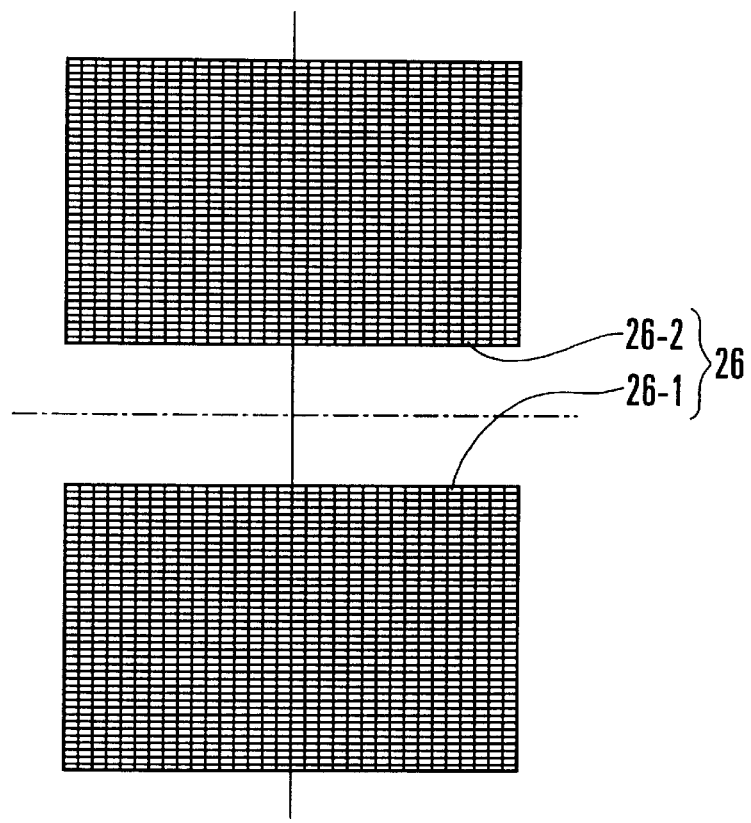
FIG. 4 shows a photoelectric conversion element of the focus detecting means in the first embodiment.

FIG. 4 is a plan view showing the photoelectric conversion element 26. As shown in FIG. 4, each of the two area sensors 26-1 and 26-2 shown in FIG. 2 which are arranged to constitute the photoelectric conversion element 26 is composed of a two-dimensional array of picture elements.

The focus detecting device configured in the above manner operates as follows. Light fluxes 27-1 and 27-2 shown in FIG. 2 come from the photo-taking lens (not shown). After passing through the main mirror 19, the light fluxes 27-1 and 27-2 are reflected by the first reflection mirror 20 in the direction of the inclination of the main mirror 19. The light fluxes 27-1 and 27-2 have their reflected directions changed by the second reflection mirror 22 to be condensed by the lenses 25-1 and 25-2 of the secondary image forming system 25 after passing through the infrared cut filter 23 and the two apertures 24-1 and 24-2 of the diaphragm 24. The condensed light fluxes then reach respectively to the surfaces of the area sensors 26-1 and 26-2 of the photoelectric conversion element 26 through the third reflection mirror 36. In the case of the illustration of FIG. 2, the light fluxes 27-1 and 27-2 represent light fluxes to be imaged on the middle part of the film 18. However, light fluxes to be imaged on other parts of the film 18 also reach the photoelectric conversion element 26 via the same optical path. As a whole, two light-quantity distributions which correspond to predetermined two-dimensional areas of the film surface 18 are obtained respectively on the area sensors 26-1 and 26-2 of the photoelectric conversion element 26. In the case of the first embodiment, the light incident on the secondary image forming system 25 is prevented from being excessively refracted, by arranging the first surface of the secondary image forming system 25 to be in a concave surface shape. By virtue of this arrangement, the secondary image forming system 25 is capable of uniformly forming an image over a wide range of the two-dimensional area of the photoelectric conversion element 26. Incidentally, in taking a shot, the first reflection mirror 20 is retracted to the outside of a photo-taking optical path in the same manner as the main mirror 19.

Figure 9:
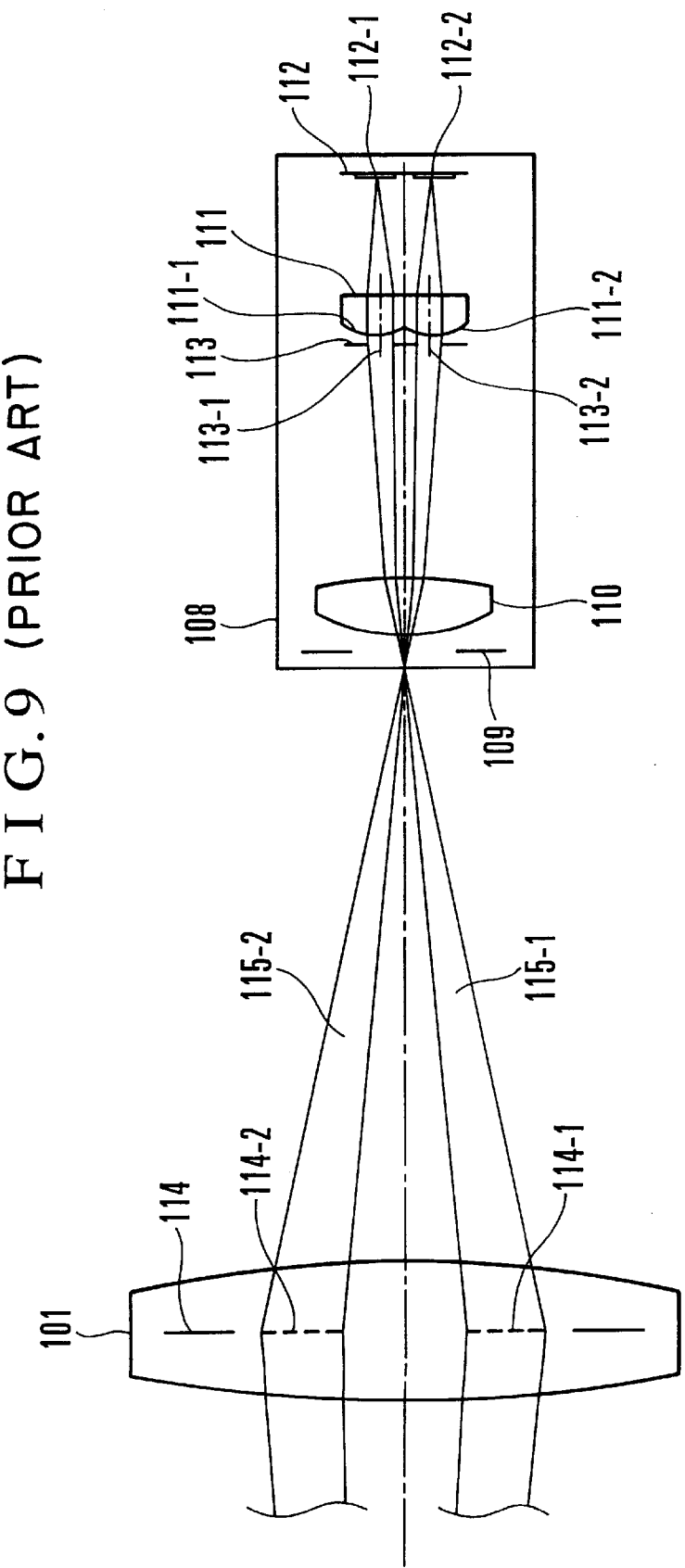
FIG. 9 shows a first example of arrangement of the conventional focus detecting device.
Figure 10:
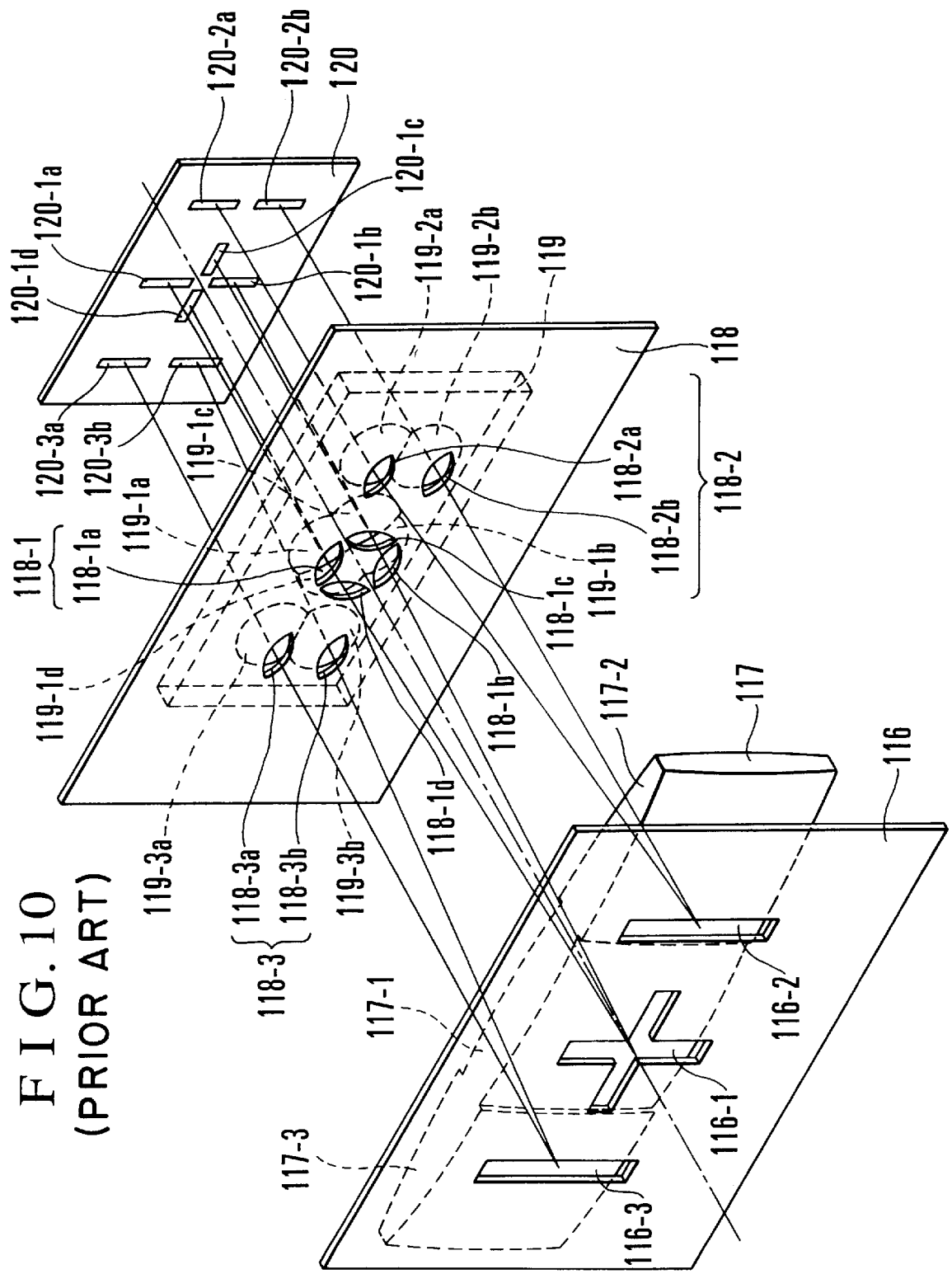
FIG. 10 shows a second example of arrangement of the conventional focus detecting device.
Figure 11:
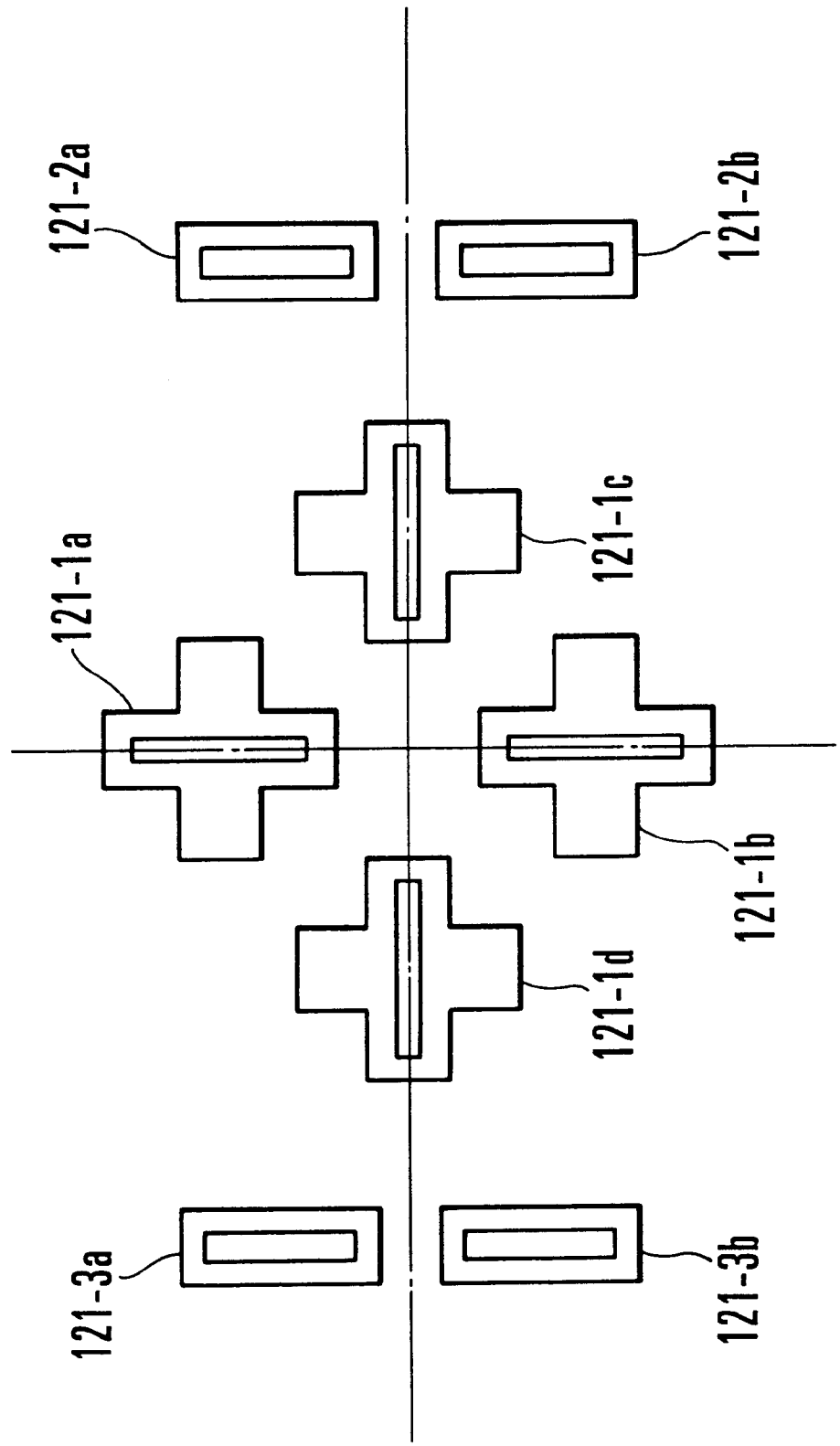
FIG. 11 shows the arrangement of a photoelectric conversion element of the second example of the conventional focus detecting device.

The focus detecting means 12 shown in FIG. 1 is arranged to compute the two light-quantity distributions to obtain a relation in the vertical direction between the relative positions of the two area sensors 26-1 and 26-2 for every position of the area sensors 26-1 and 26-2 on the same principle that is described in the foregoing with reference to FIG. 9. The focusing state of the photo-taking lens 1 is detected by this computing operation. The result of the computing operation is outputted as a focus deviation amount D.

Figure 5:
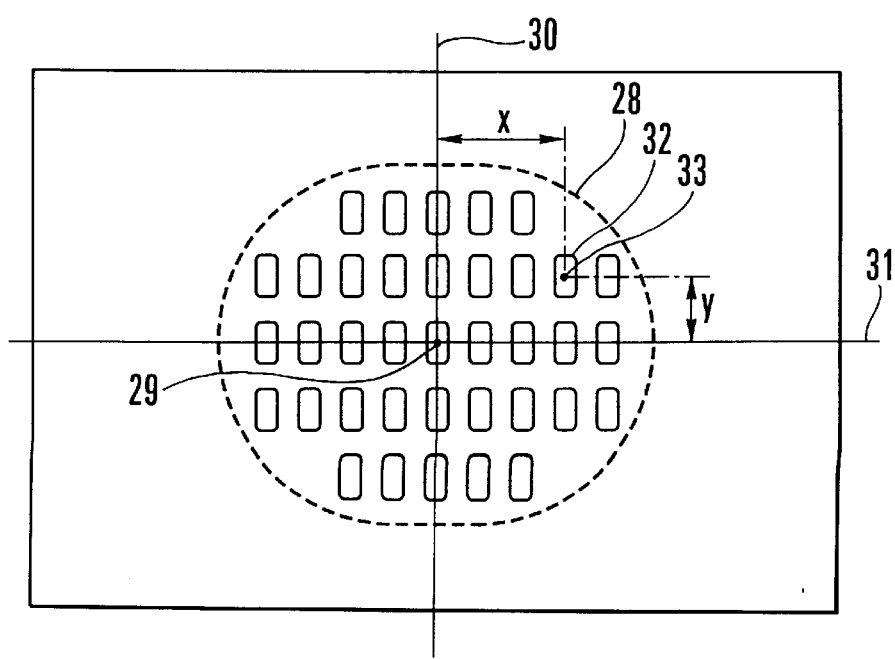
FIG. 5 shows focus detecting areas of the focus detecting means in the first embodiment.

With the focus detecting means 12 arranged as described above, the focusing state of the photo-taking lens can be detected for almost any desired area of the film 18 corresponding to the photoelectric conversion element 26, that is, for almost any desired point within the focus detecting area. Further, referring to FIG. 5, the focus detecting means 12 may be arranged to be capable of detecting focus only for specific positions dispersively located as indicated by rectangular shape within a focus detectable area 28. In the case of this modification, a liquid crystal display element or the like having a rectangular pattern as shown in FIG. 5 is disposed in the neighborhood of the focusing screen 8 shown in FIG. 1. Then, areas for which focus detection is possible or an area for which focus detection is completed can be displayed at a viewfinder under driving control of the liquid crystal display element or the like.

Further, in a case where focus detection is to be dispersively made as shown in FIG. 5, line sensors may be dispersively arranged, in place of the area sensors, in positions corresponding to focus detecting areas.

As described in the foregoing, if the focus deviation amount D which indicates a focusing state obtained from the relation between the relative positions of two images formed on the area sensors is used as it is for control over the photo-taking lens, some error would arise to make accurate focusing impossible. Therefore, the focus deviation amount D obtained at each of various focus detecting positions must be corrected with a correction value obtained for the applicable position.

However, as apparent from the arrangement of the focus detecting means 12 described above, the focus detectable area 28 which is as shown in FIG. 5 is axially symmetric only with respect to a vertical line 30 passing through the center 29 of the focus detectable area 28 and is not axially symmetric with respect to a horizontal line 31 nor has any rotational symmetry with respect to a line passing the center 29 perpendicularly to the paper surface of the drawing. Therefore, the characteristic of each point located within the focus detectable area 28 cannot be defined solely on the basis of a distance from the center 29. The above-stated correction value also cannot be allowed to be represented simply by a value related to the distance from the center 29.

Therefore, the correction value computing means 13 shown in FIG. 1 is arranged to compute a correction value C by using at least two parameters corresponding to an area for which focus detection is to be performed. For example, assuming that the current focus detecting area is an area 32 as shown in FIG. 5, the coordinates (x, y) of the center 33 of the area 32, obtained with the center 29 of the focus detectable area 28 set as an origin, are used as the parameters, and the correction value C is obtained by the following formula:

$$C = \sum_{ij} a_{ij} X^i Y^j. \qquad (2)$$

In the formula (2) above, "i" and "j" represent continuous or noncontinuous integers within a prescribed range, "$a_{ij}$" represents one or a plurality of coefficients determined by the integers "i" and "j". The coefficients "$a_{ij}$" are stored in the storage means 4 within the photo-taking lens 1 and delivered from the lens control means 5 to the camera control means 14 through the contacts 16 prior to the computing operation of the formula (2). Incidentally, the coordinates (x, y) do not have to be coordinates on the predetermined focal plane or a film surface but may be coordinates on a plane equivalent to the predetermined focal plane. The unit of the coordinate values may be normalized to be most apposite to the computing operation of the formula (2).

The camera control means 14 obtains a corrected focus detection signal $D_c$ by carrying out a computing operation similar to the formula (1) using the focus deviation amount D obtained by the focus detecting means 12 and the correction value C obtained according to the formula (2) by the correction value computing means 13. The corrected focus detection signal $D_c$ is sent to the lens control means 5 through the contacts 16 either as it is or after it is converted into a lens driving amount or the like as necessary. Upon receipt of the signal $D_c$, the lens control means 5 controls the driving means 3 on the basis of the signal $D_c$ to adjust the focusing state of the photo-taking lens 1 by moving all of or some of the component lenses of the photo-taking lens 1.

Figure 6:
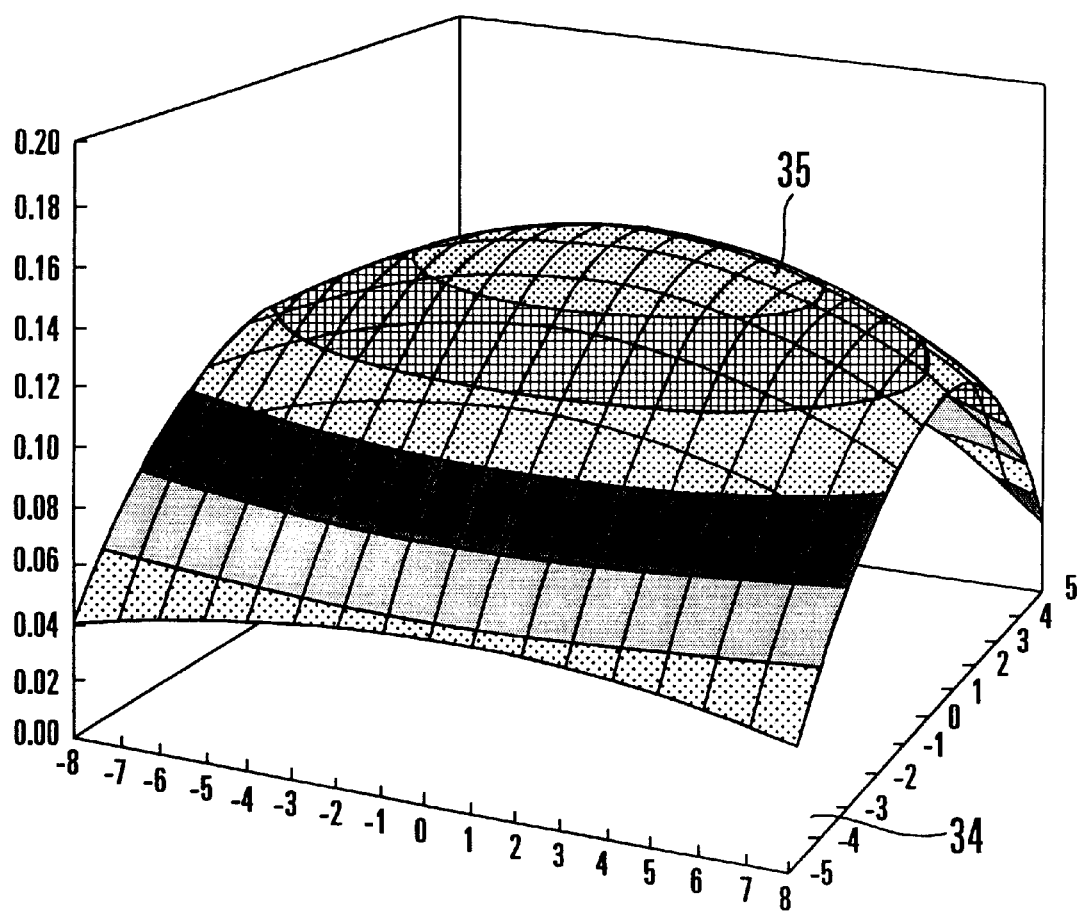
FIG. 6 shows correction values obtained in the first embodiment.

FIG. 6 is a bird's-eye view showing correction values C of a certain photo-taking lens. Correction values for a focus detectable area 34 are shown in the form of a continuous curved surface 35. In the case of FIG. 6, the curved surface 35 is obtained according to the formula (2). The values of the coefficients $a_{ij}$ are as shown below:

$a_{00}=1.53023\times10^{-1}$ $a_{01}=2.23555\times10^{-3}$ $a_{02}=-3.46357\times10^{-3}$
$a_{20}=-5.83510\times10^{-4}$ $a_{21}=-5.50092\times10^{-5}$ $a_{22}=3.89544\times10^{-6}$ In this case, the correction values C are of a quadratic expression relative to x and y axes. However, due to symmetry with respect to the y axis, all primary coefficients $a_{1j}$ of the x axis (j=0, 1, 2) are "0". The correction values C for all points in the focus detectable area are, therefore, expressed in six coefficients.

While the integers i and j are set within a range of "i=0, 2 and j=0, 1, 2" in the above-stated case, the range of the integers i and j is not limited to this range.

Further, in a case where the focus detecting area is divided into predetermined areas as shown in FIG. 5, the part $x^i y^j$ of the formula (2) for each area (x, y) is beforehand computed, and the values of $x^i y^j$, instead of parameters (x, y), are stored as parameters in a storage means disposed on the side of the camera body and are arranged to be read out at the time of computation according to the formula (2). By virtue of this arrangement, the length of time required for computation can be shortened to a great extent.

In the first embodiment described above, the correction values C are assumed to be obtained according to the computing formula (2). However, the invention is not limited to the use of the formula (2). The correction values C may be obtained by using logarithmic functions, trigonometric functions or other functions or functions expressed by combinations of these functions. In a case where the error would increase if the correction values are expressed by one function for all parts of the focus detecting area, the focus detecting area is divided into some parts and correction values for these divided areas may be expressed by continuous spline functions.

In a case where the correction values do not continuously vary over the whole focus detecting area, because different focus detecting means are arranged respectively for different focus detecting areas, it is possible to redefine functions for each of divided areas and to obtain a correction value for each of the areas by performing a computing operation suited for the area.

Further, in a case where it is impossible to limit the formula for obtaining the correction value C to one computing formula, with the invention applied to a system of using interchangeable lenses of varied kinds such as a single-lens reflex camera, the functions of a plurality of kinds are stored beforehand and information on the kind of the function to be used together with coefficients required for computing a correction value C a and on designated procedures for the computation is read out from the lens.

Figure 7:
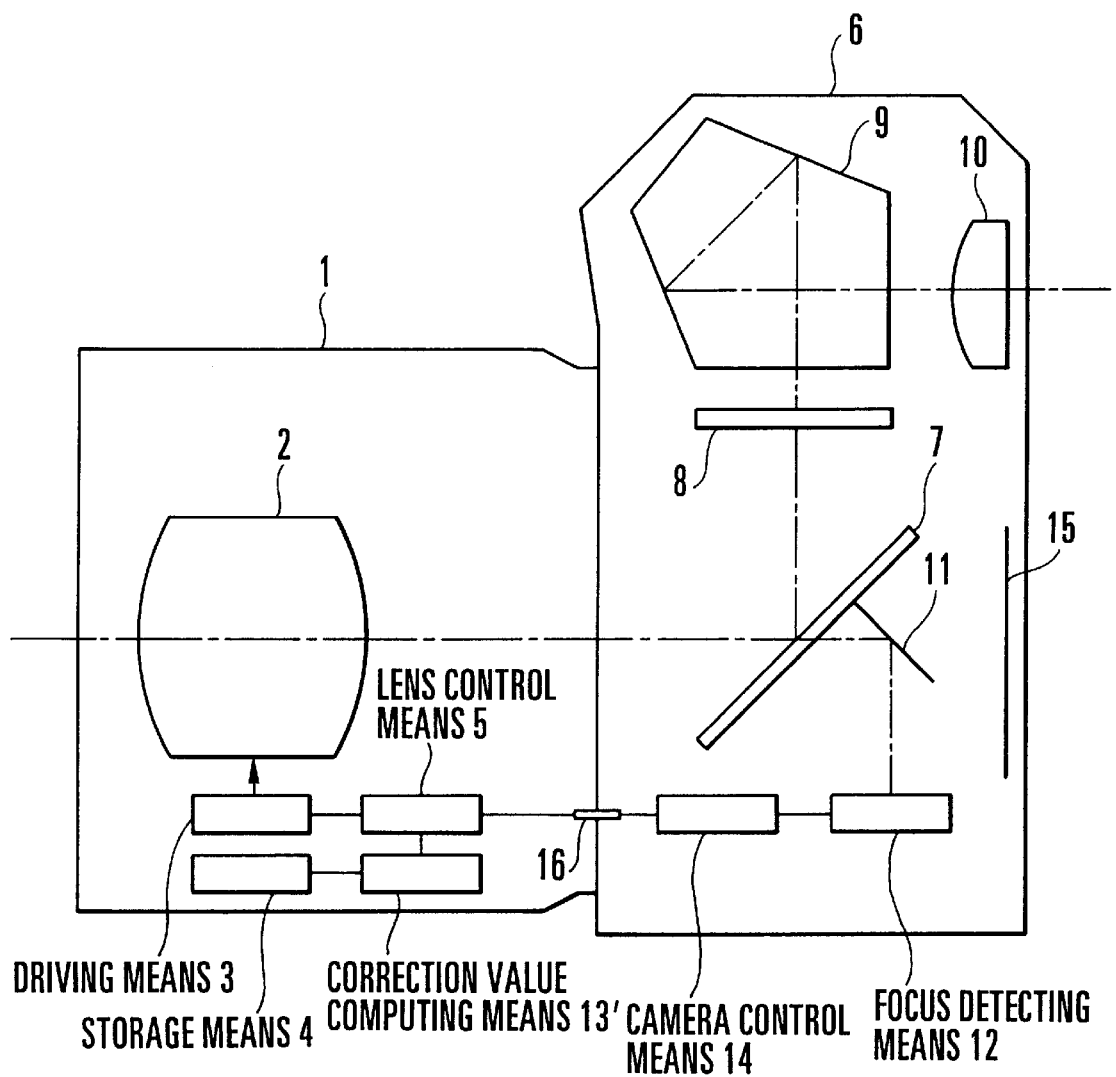
FIG. 7 shows the arrangement of a camera system equipped with a focus detecting device according to a second embodiment of the invention.
Figure 8:
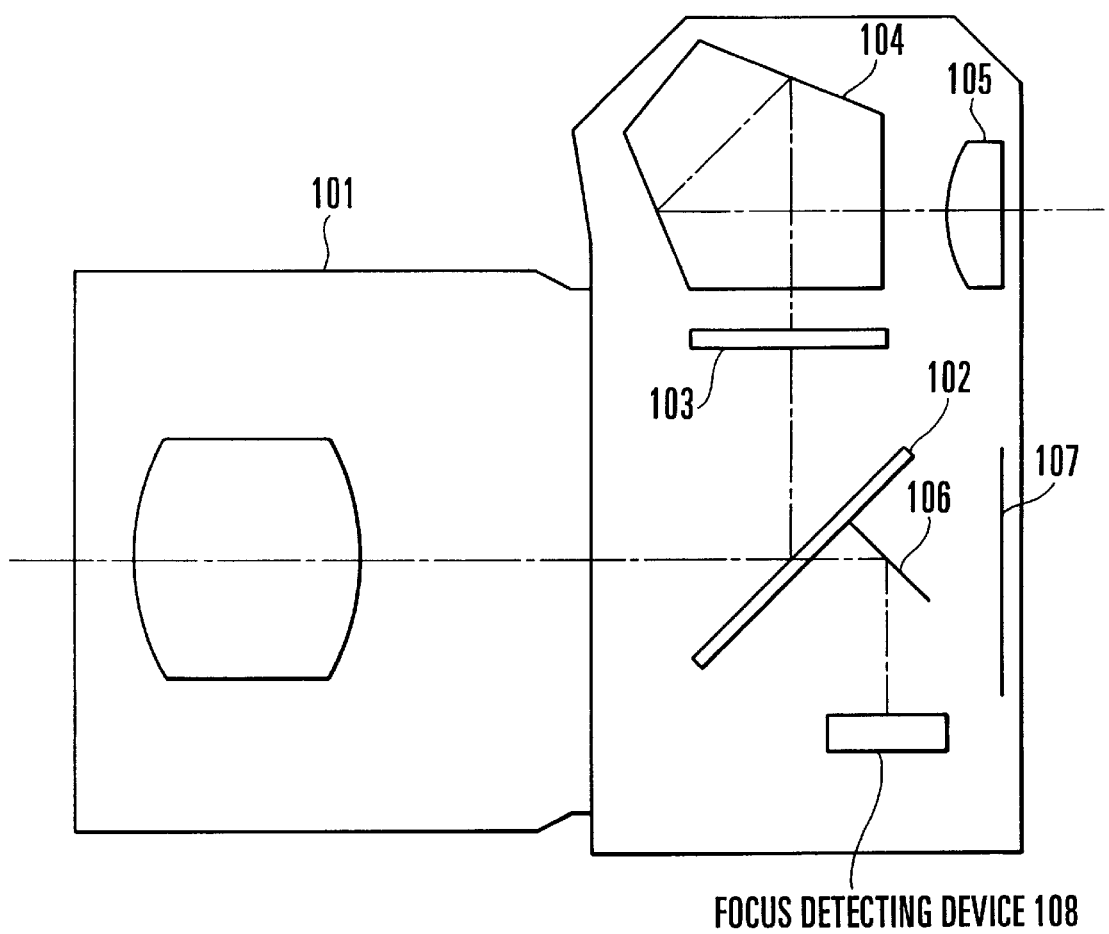
FIG. 8 shows by way of example a camera having the conventional focus detecting device.

FIG. 7 shows the arrangement of a camera system according to a second embodiment of the invention. In FIG. 7, the same parts as those of the first embodiment shown in FIG. 1 are indicated by the same reference numerals. The second embodiment differs from the first embodiment in that the correction value computing means 13 which is disposed on the side of the camera body in the first embodiment as shown in FIG. 1 is disposed on the side of the photo-taking lens 1 as correction value computing means 13' as shown in FIG. 7. In the case of the second embodiment, the correction value is computed and the focus detection signal is corrected in the following manner. The lens control means 5 first receives coordinates (x, y) indicative of the position of a focus detecting area for which focus detection is to be performed, through the contacts 16 from the camera control means 14 disposed within the camera body 6. Then, the correction value computing means 13' disposed on the side of the photo-taking lens 1 obtains a correction value C by performing the computation of the formula (2) using the coordinate values and applicable coefficient data $a_{ij}$ stored in the storage means 4. The result of the computation is sent to the camera control means 14 of the camera body 6 through the lens control means 5 and the contacts 16. After that, the focus detection signal is corrected and the photo-taking lens 1 is driven in the same manner as in the case of the first embodiment described above.

In the case of the second embodiment, the correction value is computed on the side of the lens 1. Therefore, the correction value computing formula can be set as desired according to the lens in use, so that the focus detection signal can be corrected in a manner most apposite to the lens currently in use.

Figure 12:
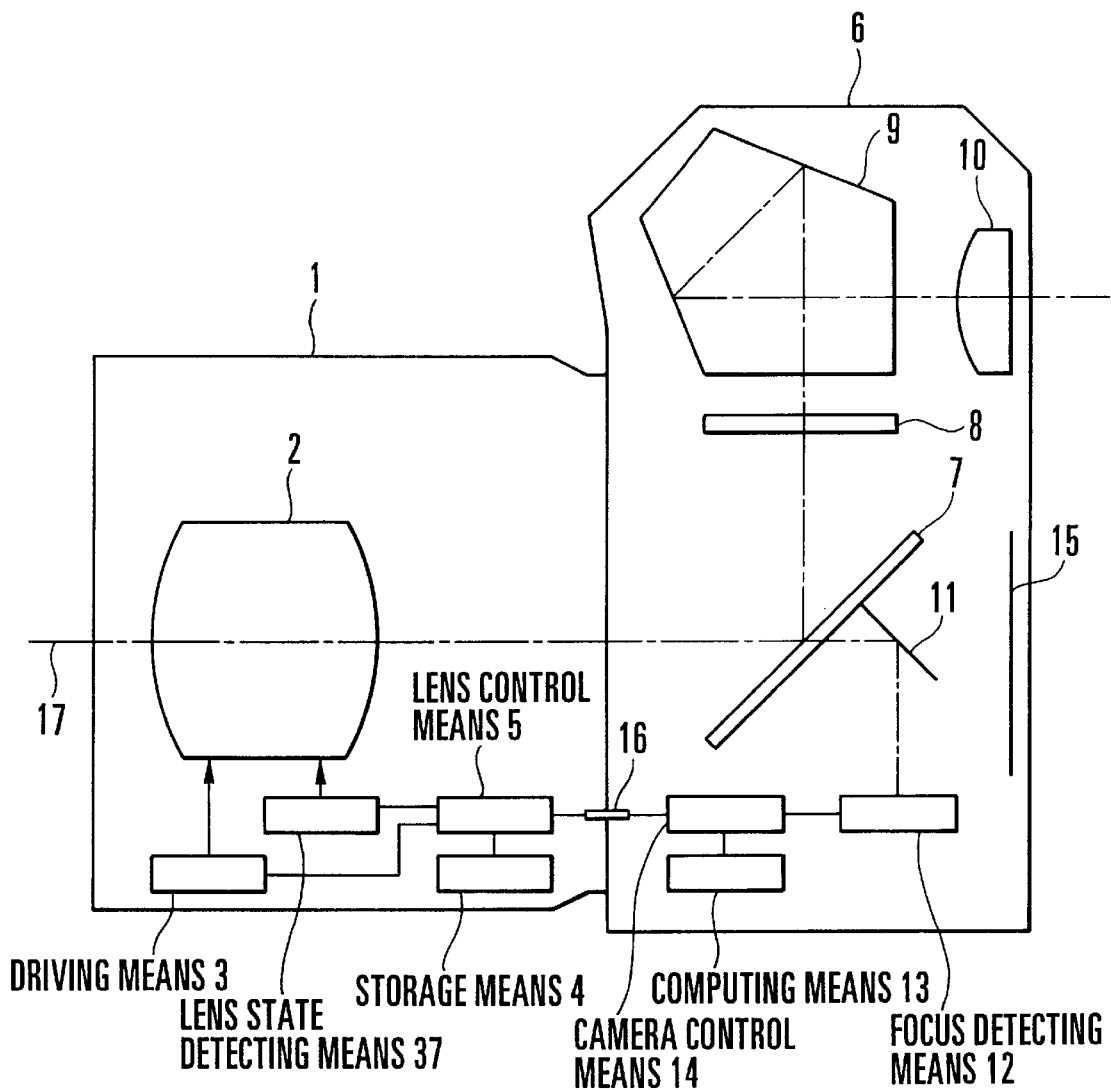
FIG. 12 shows the arrangement of a camera system equipped with a focus detecting device according to a third embodiment of the invention.

FIG. 12 is a block diagram schematically showing the arrangement of essential parts of a camera system equipped with a focus detecting device according to a third embodiment of the invention. Referring to FIG. 12, a photo-taking lens 1 which is an objective lens contains therein a photo-taking optical system 2 which is composed of one or a plurality of lens groups and has a focal length arranged to be variable by moving all of or one of the component lens groups, a lens state detecting means 37 arranged to detect the focal length, i.e., a zooming state, of the photo-taking optical system 2, a driving means 3 arranged to adjust the focusing state of the photo-taking lens 1 by moving all of or one of the lens groups constituting the photo-taking optical system 2, a storage means 4 which is a ROM or the like, and a lens control means 5 arranged to control the above parts.

The lens state detecting means 37 is arranged in a known manner to detect a moving state of the lens or an amount characterizing the moving state by using electrodes for an encoder provided on a lens barrel which rotates or moves for varying the focal length, i.e., a zooming state, of the photo-taking optical system 2 and electrodes connected to the encoder electrodes.

On the other hand, a camera body 6 contains therein a main mirror 7, a focusing screen 8 arranged to have an object image formed thereon, a pentagonal prism 9 arranged to invert the image, and an eyepiece 10, which constitute a viewfinder system. The camera body 6 further contains therein a sub-mirror 11, a focus detecting means 12, a computing means 13, a camera control means 14, and a photosensitive film 15 which is used as a photo-taking medium. The photo-taking lens 1 and the camera body 6 are provided with contacts 16 for communicating information of varied kinds between them and for supply of power with the contacts 16 connected to each other.

Figure 13:
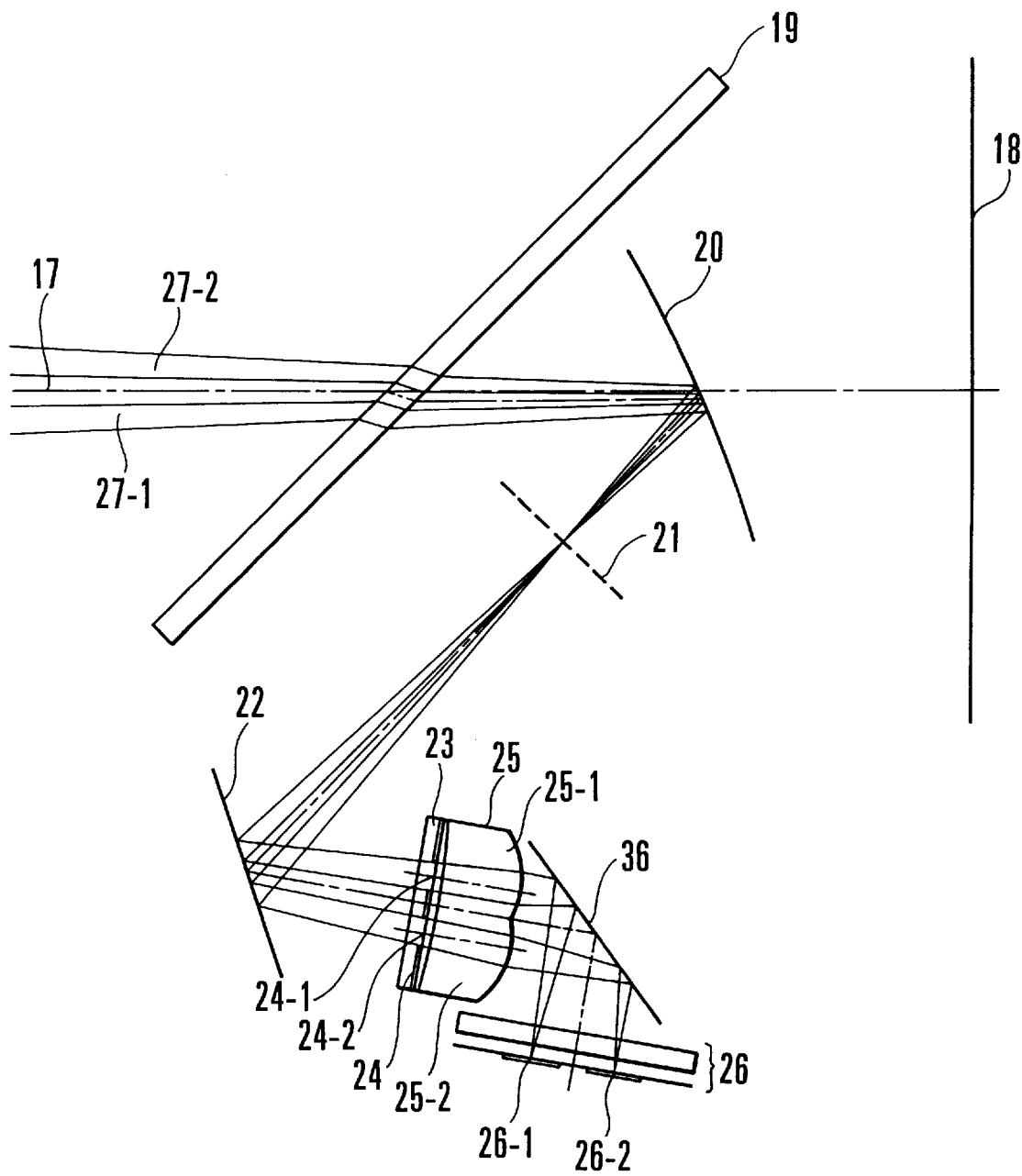
FIG. 13 shows the optical arrangement of a focus detecting means in the third embodiment.

FIG. 13 shows in detail the optical arrangement of the focus detecting means 12 shown in FIG. 12. This arrangement is the same as the arrangement shown in FIG. 2. The diaphragm 24 and the photoelectric conversion element 26 are also arranged in the same manner as the arrangement shown in FIGS. 3 and 4.

With the focus detecting means 12 arranged as shown in FIG. 13, the second embodiment operates as follows. Referring to FIG. 13, light fluxes 27-1 and 27-2 from the photo-taking lens 1 pass through the half-mirror surface of the main mirror 19. After passing through the main mirror 19, the light fluxes 27-1 and 27-2 are reflected by the first reflection mirror 20 in the direction of the inclination of the main mirror 19. The light fluxes 27-1 and 27-2 have their reflected direction changed by the second reflection mirror 22 to be condensed by the lenses 25-1 and 25-2 of the secondary image forming system 25 after passing through the infrared cut filter 23 and the two apertures 24-1 and 24-2 of the diaphragm 24. The condensed light fluxes then reach respectively to the surfaces of the area sensors 26-1 and 26-2 of the photoelectric conversion element 26 through the third reflection mirror 36.

In the case of FIG. 13, the light fluxes 27-1 and 27-2 represent light fluxes to be imaged on the middle part of the film 18. However, light fluxes to be imaged on other parts of the film 18 also reach the photoelectric conversion element 26 through the same optical path. As a whole, two light-quantity distributions which correspond to predetermined two-dimensional areas of the film surface 18 are obtained respectively on the area sensors 26-1 and 26-2 of the photoelectric conversion element 26.

In the third embodiment, the light incident on the secondary image forming system 25 is prevented from being excessively refracted by arranging the first surface of the secondary image forming system 25 to be in a concave surface shape. By virtue of this arrangement, the secondary image forming system 25 is capable of uniformly forming an image over a wide range of the two-dimensional area of the photoelectric conversion element 26. Incidentally, in taking a shot, the first reflection mirror 20 is retracted to the outside of a photo-taking optical path in the same manner as the main mirror 19.

The focus detecting means 12 shown in FIG. 12 is arranged to perform a computing operation on the two light-quantity distributions to obtain a relation in the vertical direction, i.e., in the dividing direction of the object images, between the relative positions of the two area sensors 26-1 and 26-2 for every position of the area sensors 26-1 and 26-2 shown in FIG. 4 on the basis of the principle of the known focus detecting method. The focusing state of the photo-taking lens 1 is thus detected by this computation. The result of the computation is outputted as a focus deviation amount D.

With the focus detecting means 12 arranged as described above, the focusing state of the photo-taking lens 1 can be detected for almost any desired area of the film 18 corresponding to area sensors of the photoelectric conversion element 26, that is, for almost any desired point within the focus detecting area. Further, the focus detecting means 12 may be arranged to be capable of detecting focus only for specific positions dispersively located as indicated by rectangular shape within a focus detectable area, like the area 28 shown in FIG. 5. In the case of such a modification, a liquid crystal display element or the like having a rectangular pattern as shown in FIG. 5 is disposed in the neighborhood of the focusing screen 8 shown in FIG. 12. Then, areas for which focus detection is possible or an area for which focus detection is completed can be displayed at a viewfinder under driving control of the liquid crystal display element or the like.

As described in the foregoing, if the focus deviation amount D which indicates a focusing state obtained from the relation between the relative positions of two images formed on the area sensors is used as it is for control over the photo-taking lens, some error would arise to make accurate focusing impossible. Therefore, the focus deviation amount D obtained at each of various focus detecting positions must be corrected with a correction value obtained for the applicable position.

However, as apparent from the arrangement of the focus detecting means 12 described above, the focus detectable area 28 which is as shown in FIG. 5 is axially symmetric only with respect to a vertical line 30 passing through the center 29 of the focus detectable area 28 and is not axially symmetric with respect to a horizontal line 31 nor has any rotational symmetry with respect to a line passing the center 29 perpendicularly to the paper surface of the drawing. Therefore, the characteristic of each point located within the focus detectable area 28 cannot be defined solely on the basis of a distance from the center point 29. The above-stated correction value also cannot be allowed to be represented simply by a value related to the distance from the center point 29. The third embodiment, therefore, computes a correction value and makes correction with the correction value in the following manner.

Referring to FIG. 12, the lens state detecting means 37 first detects a zooming state of the photo-taking lens 1 and sends a parameter indicating the zooming state detected, such as a focal length "f", to the lens control means 5. The lens control means 5 reads the focal length f and also an intrinsic constant $_{ij}b_k$ which indicates the intrinsic characteristic of the photo-taking lens 1 and is stored beforehand in the storage means 4. The lens control means 5 sends the information thus obtained to the camera control means 14 through the contacts 16. Here, an exponent attached to this intrinsic constant represents an integer within a certain range. The meaning of the integer will become apparent from a computing formula described below.

The computing means 13 disposed on the side of the camera body 6 functions as a state constant computing means. The computing means 13 computes and obtains a state constant $a_{ij}$ corresponding to the state of the photo-taking lens 1 by the following formula using the focal length "f" and the intrinsic constant $_{ij}b_k$ which are sent from the photo-taking lens 1 to the camera control means 14.

$$a_{ij} = \sum_k {}_{ij}b_k \cdot f^k. \tag{3}$$

After the state constant $a_{ij}$ is obtained by the above-stated computing operation, the computing means 13 functions as a means for computing a correction value. The computing means 13 then uses the state constant $a_{ij}$ to obtain a correction value C through a computing operation which is performed according to the following formula:

$$C = \sum_{ij} a_{ij} X^i Y^j. \tag{4}$$

Assuming that the area for which the focus detection is to be made is a rectangular area 32 as shown in FIG. 5, "x" and "y" in the formula (4) above represent the coordinates of the center 33 of the area 32 obtained with the center point 29 of the focus detectable area 28 shown in FIG. 5 used as an origin. As apparent from the formulas (3) and (4), the exponents k, i and j of the constants $_{ij}b_k$ and $a_{ij}$ represent exponents of power related to the focal length f and the coordinates (x, y) of the area for which the focus detection is to be made and are continuous or noncontinuous integers within a predetermined range. Their values do not have to be always unvarying and may be variable according to the characteristics of the photo-taking lens 1. Further, in the arrangement of the third embodiment, the computing means 13 is assumed to act as the state constant computing means and also as the correction value computing means.

Further, the coordinates (x, y) which are used as parameters indicating a focus detecting area do not have to be limited to the coordinates on the predetermined focal plane or a film surface but may be replaced with coordinates on a plane equivalent to the film surface or with coordinates undergone some converting process. The unit of the coordinate values may be normalized into some unit best suited for the computing formula (4).

The camera control means 14 (correction value computing means) performs a computing operation in the same manner as the formula (1) by using the focus deviation amount D obtained by the focus detecting means 12 and the correction value C obtained from the formula (4) by the computing means 13, to obtain a corrected focus detection signal $D_c$. The corrected focus detection signal $D_c$ is sent to the lens control means 5 through the contacts 16 either as it is or, if necessary, after it is converted into a lens driving amount. Upon receipt of this signal, the lens control means 5 controls and causes the driving means 3 to adjust the focusing state of the photo-taking lens 1 by moving all of or some of the lenses of the photo-taking optical system 2.

Figure 14A:
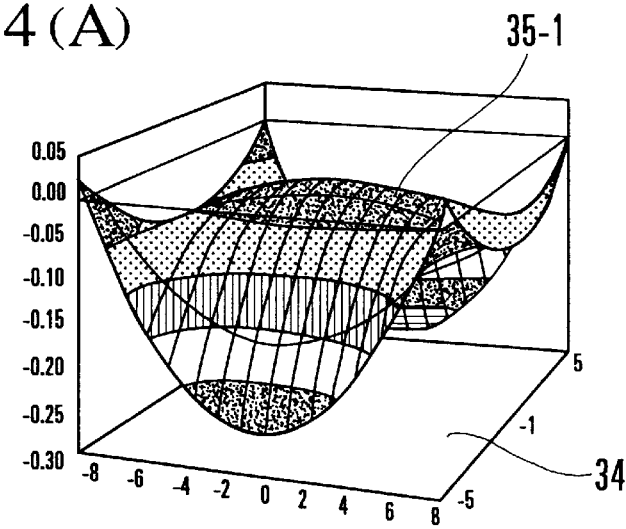
FIGS. 14(A), 14(B) and 14(C) show correction values obtained in the third embodiment.
Figure 14B:
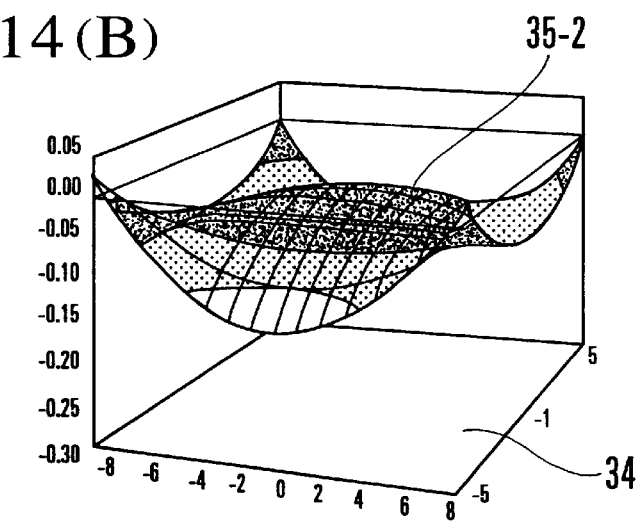
Figure 14C:
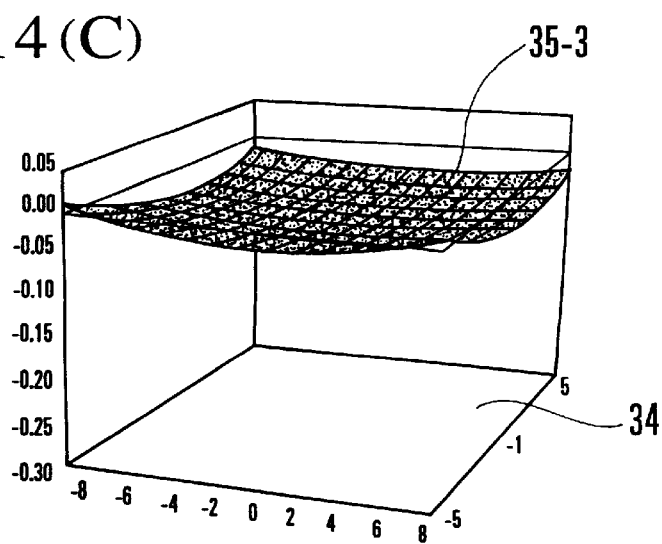

FIGS. 14(A), 14(B) and 14(C) are bird's-eye views respectively showing the correction values C for three focal length states (29.1 mm, 50.0 mm and 76.7 mm) within a zooming area between a wide-angle end position and a telephoto end position of a zoom lens which has a focal length range from 28 mm to 80 mm. The correction values for a focus detectable area 34 are shown in curved surfaces 35-1 to 35-3. Changes taking place in the curved surfaces indicative of the correction values due to changes in focal length f can be closely approximated by the formulas (3) and (4). In the case of the third embodiment, the values of the intrinsic constant $_{ij}b_k$ are as shown below:

| | |
|---|---|
| $_{00}b_0 = 2.63620$ | $_{20}b_0 = 3.28948 \times 10^{-3}$ |
| $_{00}b_1 = -2.42676 \times 10^{-1}$ | $_{20}b_1 = -1.68544 \times 10^{-4}$ |
| $_{00}b_2 = 8.01275 \times 10^{-3}$ | $_{20}b_2 = -2.32388 \times 10^{-6}$ |
| $_{00}b_3 = -1.13286 \times 10^{-4}$ | $_{20}b_3 = 1.38408 \times 10^{-7}$ |
| $_{00}b_4 = 5.75423 \times 10^{-7}$ | $_{20}b_4 = -1.12769 \times 10^{-9}$ |
| $_{01}b_0 = 1.17512 \times 10^{-1}$ | $_{21}b_0 = -3.48085 \times 10^{-3}$ |
| $_{01}b_1 = -1.05952 \times 10^{-2}$ | $_{21}b_1 = 3.05693 \times 10^{-4}$ |
| $_{01}b_2 = 3.31134 \times 10^{-4}$ | $_{21}b_2 = -9.60849 \times 10^{-6}$ |
| $_{01}b_3 = -4.39150 \times 10^{-6}$ | $_{21}b_3 = 1.28713 \times 10^{-7}$ |
| $_{01}b_4 = 2.10212 \times 10^{-8}$ | $_{21}b_4 = -6.22562 \times 10^{-10}$ |
| $_{02}b_0 = 2.81480 \times 10^{-2}$ | $_{22}b_0 = -1.07168 \times 10^{-3}$ |
| $_{02}b_1 = -3.16184 \times 10^{-3}$ | $_{22}b_1 = 1.07038 \times 10^{-4}$ |
| $_{02}b_2 = 8.65798 \times 10^{-5}$ | $_{22}b_2 = -3.04482 \times 10^{-6}$ |
| $_{02}b_3 = -8.73344 \times 10^{-7}$ | $_{22}b_3 = 3.46466 \times 10^{-8}$ |
| $_{02}b_4 = 2.88062 \times 10^{-9}$ | $_{22}b_4 = -1.40090 \times 10^{-10}$ |

By using these values of the intrinsic constant $_{ij}b_k$, not only the values of the state constant $a_{ij}$ for the focal lengths f in FIGS. 14(A), 14(B) and 14(C) but also the values of the state constant $a_{ij}$ for other focal lengths f can be accurately computed in accordance with the formula (3). The values of the state constant $a_{ij}$ for each of the focal lengths in FIGS. 14(A), 14(B) and 14(C) which are obtainable by the formula (3) are as shown below:

Fig. 14 (A)
$a_{00} = -1.92192 \times 10^{-2}$  $a_{01} = -3.53386 \times 10^{-3}$  $a_{02} = -9.99921 \times 10^{-3}$
$a_{20} = -9.79780 \times 10^{-4}$  $a_{21} = 3.34633 \times 10^{-6}$  $a_{22} = 2.17978 \times 10^{-4}$ Fig. 14 (B)
$a_{00} = -3.00709 \times 10^{-2}$  $a_{01} = -1.96670 \times 10^{-3}$  $a_{02} = -4.65863 \times 10^{-3}$
$a_{20} = -6.94517 \times 10^{-4}$  $a_{21} = -1.93460 \times 10^{-5}$  $a_{22} = 1.23437 \times 10^{-4}$ Fig. 14 (C)
$a_{00} = -4.22666 \times 10^{-2}$  $a_{01} = -1.15450 \times 10^{-3}$  $a_{02} = 6.03941 \times 10^{-4}$
$a_{20} = 1.20797 \times 10^{-4}$  $a_{21} = -2.74064 \times 10^{-5}$  $a_{22} = 1.07257 \times 10^{-5}$ In the case of the third embodiment, each state constant $a_{ij}$ is expressed by a biquadratic power series of the focal length f. The correction value C is of a quadratic expression related to x and y axes. However, due to symmetry with respect to the y axis, all primary coefficients $a_{1j}$ of the x axis (j=0, 1, 2) are "0". The correction values C for all points in the focus detectable area are, therefore, expressed in six coefficients.

In the third embodiment, as described above, for the state of the photo-taking lens at a certain fixed focal length f, the correction value is expressed by using six state constants $a_{ij}$ and each of the state constants $a_{ij}$ is computed from five intrinsic constants $_{ij}b_k$. Therefore, in order to make a correction value available for the state of the photo-taking lens at any desired focal length f, a total of 30(=6×5) constants must be kept in store at the storage means.

On the other hand, in a case where the state constants are not computed from intrinsic constants and the state constants are stored beforehand in a storage device for every divided area obtained by dividing a range of focal lengths into a plurality of areas, a total of p×q constants is necessary with the dividing number assumed to be p and the number of state constants necessary for obtaining correction values respectively for these divided areas assumed to be q. Assuming that the number q is 6 like in the case of the third embodiment, in a case where the area dividing number p is more than 5, the number of constants which must be kept in store becomes smaller according to the arrangement of the third embodiment.

With regard to zoom lenses in general, in order to accurately obtain correction values, the focal length range must be divided at least into eight areas. In the event of a great fluctuations in aberration or a bright lens requiring a particularly high degree of precision, the focal length range is preferably divided into at least 16 areas. Therefore, the correction value computing method of the invention disclosed permits reduction in number of constants to be stored for many zoom lenses.

In a case where a focus detecting area is divided into predetermined divided areas as shown in FIG. 5, the part of $x^i y^j$ of the formula (4) is computed beforehand for the coordinates (x, y) of each of divided areas. The computed values of the part of $x^i y^j$ are stored as parameters, instead of the coordinates (x, y), in the storage means on the side of the camera body. The values stored are read out when the computing operation is performed according to the formula (4), so that the time required for the computation can be shortened to a great extent.

In the third embodiment described above, the correction values are assumed to be obtained according to the computing formulas (3) and (4). However, the invention is not limited to the use of these formulas. The correction values may be obtained by using logarithmic functions, trigonometric functions or other functions or functions expressed by combinations of these functions. In a case where the error would increase if a correction value is expressed only by one function for all parts of the focus detecting area, the focus detecting area is divided into some parts and correction values for these divided areas may be expressed by continuous spline functions.

In a case where the correction value does not continuously vary over the whole focus detecting area, because different focus detecting means are arranged respectively for different focus detecting areas, it is possible to redefine functions for each of divided areas and to obtain a correction value for each of the areas by performing a computing operation suited for the area.

Further, in a case where it is impossible to limit the formula for obtaining correction values to one computing method, with the invention applied to a system using interchangeable lenses of varied kinds such as a single-lens reflex camera, computing methods of varied kinds are arranged beforehand and information designating the kind of functions to be used and computing procedures are read out from the side of the lens together with constants necessary for computing correction values.

FIG. 15 shows in a block diagram essential parts of a fourth embodiment of the invention. In FIG. 15, the same parts as those shown in FIG. 12 are indicated with the same reference numerals. The fourth embodiment are arranged in the same manner as the third embodiment with the exception that the computing means 13 in the third embodiment which is disposed on the side of the camera body 6 as shown in FIG. 12 is disposed as a computing means 13' on the side of the photo-taking lens 1. In the case of the fourth embodiment, the correction value is computed and the focus detection signal is corrected as described below.

Referring to FIG. 15, the computing means 13' which is disposed on the side of the photo-taking lens 1 receives the result of a detection made by the lens state detecting means 37 through the lens control means 5 and reads the intrinsic constant $_{ij}b_k$ from the storage means 4. Then, using the result of the detection and the intrinsic constant $_{ij}b_k$, the computing means 13' obtains the state constant $a_{ij}$ by performing a computing operation according to the formula (3). Following this process, the computing means 13' receives information on coordinates (x, Y) indicative of the position of a focus detecting area for which focus detection is to be made, from the camera control means 14 through the contacts 16 and the lens control means 5. Then, the computing means 13' obtains a correction value C through a computing operation according to the formula (4) using the coordinates (x, y) and the state constant $a_{ij}$. The correction value C thus obtained is sent to the camera control means 14 on the side of the camera body 6 through the lens control means 5 and the contacts 16. After that, a focus detection signal is corrected and the photo-taking lens 1 is driven in the same manner as in the case of the third embodiment.

The third embodiment shown in FIG. 12 is arranged to carry out the computing operations according to the formulas (3) and (4) for obtaining the correction value C on the side of the camera body 6, whereas the fourth embodiment is arranged to carry out all the computing operations on the side of the photo-taking lens 1. The arrangement of the fourth embodiment, therefore, permits setting the mode of carrying out the computing formulas as desired according to each of photo-taking lenses of varied types, so that the correction can be carried out in an optimum manner for each photo-taking lens.

Further, in the case of a fifth embodiment of the invention, a focus detecting device of a camera system is arranged to carry out the computation of the formula (3) on the side of the photo-taking lens 1 and the computation of the formula (4) on the side of the camera body 6. This arrangement enables the fifth embodiment to compute, on each side in a closed manner, information apposite to the intrinsic conditions of the photo-taking lens and the camera body, such as the state of the photo-taking lens and the focus detecting area of the camera. Therefore, the amount of communication between the photo-taking lens 1 and the camera body 6 can be curtailed and a computing load can be dispersed. Thus, the speed of an eventual focusing action can be increased.

Each of the embodiments described above is arranged by paying attention to the fact that the focal length of the photo-taking lens (a zooming state) causes variations in aberration. However, the variations of aberration are not only caused by the focal length but also by the state of location of a focusing lens which is provided for adjustment of the focus of the photo-taking lens (a focusable object distance "s").

Figure 16:
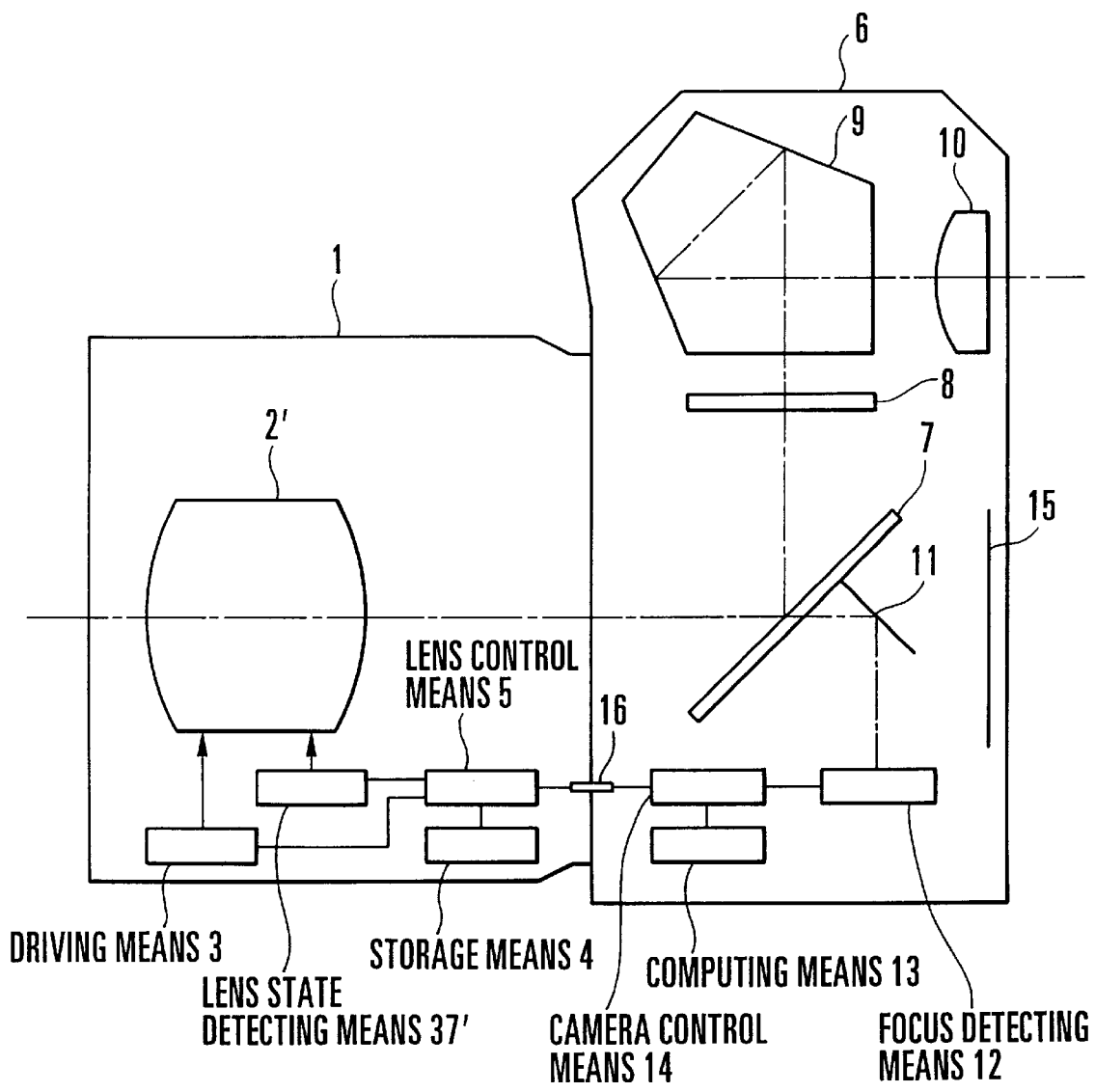
FIG. 16 shows the arrangement of a camera system equipped with a focus detecting device according to a sixth embodiment of the invention.

FIG. 16 is a block diagram showing essential parts of a sixth embodiment of the invention. The sixth embodiment is arranged by paying attention to the state of location of the focusing lens. Referring to FIG. 16, a photo-taking optical system 2' is a single focal length lens. Unlike the lens state detecting means 37 in the third embodiment shown in FIG. 12 which is arranged to detect the focal length (zooming state), a lens state detecting means 37' in the sixth embodiment is arranged to detect the state of location of the focusing lens (the focusable object distance "s").

In the sixth embodiment, the state of location of the focusing lens of the photo-taking optical system 2' (the focusable object distance "s") is detected by an electrode for an encoder disposed on a lens barrel arranged to move one or a plurality of lenses for focusing and a detection electrode which is connected to the encoder electrode. After the state of the focusing lens is detected by the lens state detecting means 37', a correction value is computed and correction is carried out in the same manner as in the case of the third embodiment, except that the following formula (5) is employed in place of the formula (3):

$$a_{ij} = \sum_k {}_{ij}b_k \cdot s^k. \tag{5}$$

It is of course possible to arrange the sixth embodiment to perform all necessary computing operations on the side of the photo-taking lens or to have the computing operations shared by the photo-taking lens and the camera body.

Figure 17A:
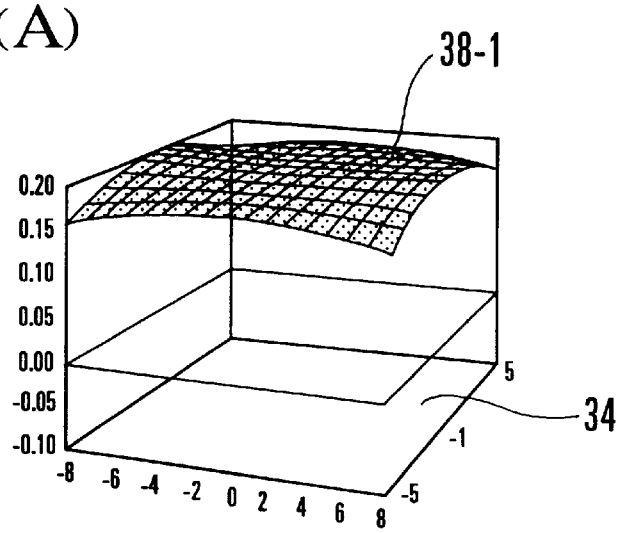
FIGS. 17(B) and 17(C) show correction values obtained in the sixth embodiment.
Figure 17B:
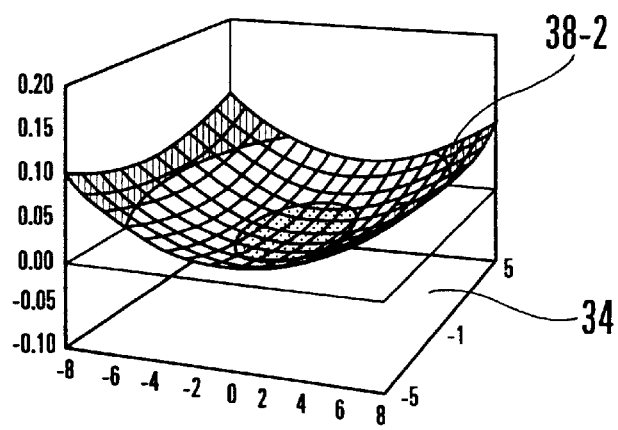
Figure 17C:
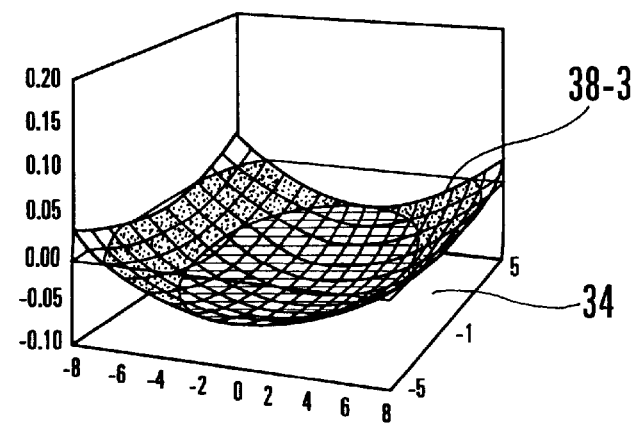

FIGS. 17(A), 17(B) and 17(C) show in bird's-eye views the correction values C for three states of location of the focusing lens, i.e., for focusable object distances of 300, 650 and 10000 cm, between a nearest object distance to an infinity object distance of a single focal length lens having a focal length of 300 mm. In FIGS. 17(A), 17(B) and 17(C), the correction values for a focus detectable area 34 are shown respectively in the forms of continuous curved surfaces 38-1, 38-2 and 38-3. Changes taking place in the curved surfaces indicative of correction values due to the state of location of the focusing lens (focusable object distance) can be closely approximated by the formulas (5) and (4). In the case of the sixth embodiment, the values of the intrinsic constant $_{ij}b_k$ are as shown below:

| | |
|---|---|
| $_{00}b_{-3}$ = 2.58151 × 10⁶ | $_{20}b_{-3}$ = −1.82482 × 10⁵ |
| $_{00}b_{-2}$ = 5.79790 × 10³ | $_{20}b_{-2}$ = 6.90714 × 10² |
| $_{00}b_{-1}$ = 3.64036 × 10¹ | $_{20}b_{-1}$ = −6.31244 × 10⁻¹ |
| $_{00}b_{0}$ = −8.80337 × 10⁻² | $_{20}b_{0}$ = 1.26181 × 10⁻³ |
| $_{01}b_{-3}$ = 2.08220 × 10⁵ | $_{21}b_{-3}$ = −5.38152 × 10³ |
| $_{01}b_{-2}$ = −1.29516 × 10⁻³ | $_{21}b_{-2}$ = 3.30042 × 10¹ |
| $_{01}b_{-1}$ = 2.09489 | $_{21}b_{-1}$ = −5.00475 × 10⁻² |
| $_{01}b_{0}$ = −2.16675 × 10⁻⁴ | $_{21}b_{0}$ = 4.97814 × 10⁻⁶ |
| $_{02}b_{-3}$ = −1.71206 × 10⁵ | $_{22}b_{-3}$ = −1.28248 × 10³ |
| $_{02}b_{-2}$ = 6.43961 × 10² | $_{22}b_{-2}$ = 3.21624 |
| $_{02}b_{-1}$ = −8.76539 × 10⁻¹ | $_{22}b_{-1}$ = −9.65103 × 10⁻⁴ |
| $_{02}b_{-0}$ = 1.65283 × 10⁻³ | $_{22}b_{0}$ = −1.45070 × 10⁻⁷ |

By using these values of the intrinsic constant $_{ij}b_k$, not only the values of the state constant $a_{ij}$ for the object distances in FIGS. 17(A), 17(B) and 17(C) but also the values of the state constant $a_{ij}$ for any desired focusable object distances "s" can be accurately computed in accordance with the formula (5). The values of the state constant $a_{ij}$ for each of the object distances "s" in FIGS. 17(A), 17(B) and 17(C) obtainable by the formula (5) are as shown below:

In the case of the sixth embodiment, each state constant $a_{ij}$ is expressed by a cubical power series of a reciprocal number of the object distance "s". The correction value C for the state of one object distance is expressed as a quadratic expression related to x and y axes like in the case of the third embodiment by using six state constants, and each state constant is computed from four intrinsic constants. Therefore, in order to obtain a correction value for a desired object distance, a total of 24(=6×4) intrinsic constants must be used.

With the arrangement of the sixth embodiment applied to a lens wherein its aberration greatly varies in relation to variations of object distance, the number of constants to be stored can be lessened. Incidentally, in the case of the sixth embodiment, object distances are expressed in cm.

Figure 18:
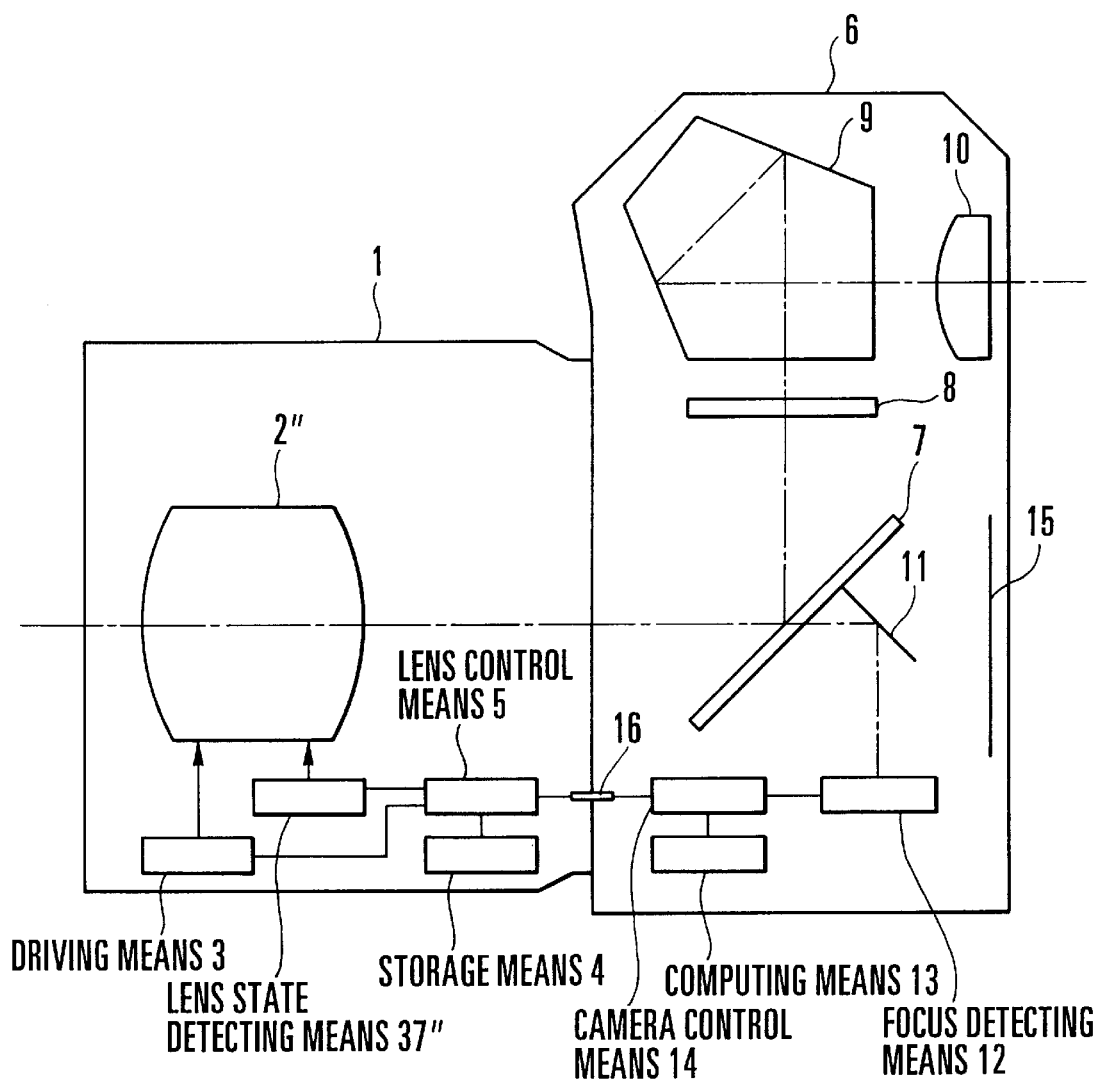
FIG. 18 shows the arrangement of a camera system equipped with a focus detecting device according to a seventh embodiment of the invention.

FIG. 18 is a block diagram showing a seventh embodiment of the invention. The seventh embodiment is arranged to detect both the zooming state and the state of location of a focusing lens and to have intrinsic constants for combinations of the zooming state and the state of location of the focusing lens.

The arrangement of the seventh embodiment is similar to the third and sixth embodiments shown in FIGS. 12 and 16 but differs from them in the following points. In the seventh embodiment, a photo-taking optical system 2″ has its aberration vary to a relatively great extent in relation to variations of both the zooming state and the state of location of the focusing lens, and a lens state detecting means 37″ is arranged to be capable of detecting both the zooming state of the photo-taking lens 1 (focal length "f") and the state of location of the focusing lens (focusable object distance "s"). The storage means 4 is arranged to retain intrinsic constants $_{ij}b_{km}$ related to both the focal lengths "f" of the photo-taking lens 1 and the focusable object distances "s". In computing the state constant $a_{ij}$, the following formula (6) is used in place of the formula (3) or (5):

$$a_{ij} = \sum_{k,m} {}_{ij}b_{km} \cdot f^k \cdot s^m. \qquad (6)$$

After the state constant $a_{ij}$ is obtained, the computing operations of the formulas (4) and (1) are performed to obtain a corrected focus detection signal and the focus of the photo-taking lens 1 is adjusted in the same manner as in each of the embodiments described in the foregoing.

FIGS. 19(A)(i) to 19(A)(iii), 19(B)(i) to 19(B)(iii) and 19(C)(i) to 19(C)(iii) show in bird's-eye views the correction values C for a zoom lens of a focal length range from 28 mm to 105 mm, covering combinations of three focal length states, i.e., (A) 29.0 mm, (B) 68.3 mm and (C) 101.0 mm, and three states of location of the focusing lens, i.e., (i) 51.2 cm, (ii) 140.7 cm and (iii) 10000.0 cm. Changes taking place in the curved surfaces indicative of the correction values due to the zooming state and the state of location of the focusing lens can be closely approximated by the formulas (6) and (4). In the case of the seventh embodiment, the values of the intrinsic constant $_{ij}b_{km}$ are as shown below:

| | |
|---|---|
| $_{00}b_{0-1}$ = 5.88471 | $_{20}b_{0-1}$ = −6.39029 × 10⁻² |
| $_{00}b_{00}$ = 7.74959 × 10⁻⁴ | $_{20}b_{00}$ = 2.86681 × 10⁻⁵ |
| $_{00}b_{01}$ = 6.94592 × 10⁻⁷ | $_{20}b_{01}$ = −1.76853 × 10⁻⁷ |
| $_{00}b_{1-1}$ = −4.10150 × 10⁻¹ | $_{20}b_{1-1}$ = 5.00249 × 10⁻³ |
| $_{00}b_{10}$ = 6.16179 × 10⁻⁴ | $_{20}b_{10}$ = −1.11384 × 10⁻⁴ |
| $_{00}b_{11}$ = −5.17015 × 10⁻⁹ | $_{20}b_{11}$ = 1.07601 × 10⁻⁸ |
| $_{00}b_{2-1}$ = 1.19142 × 10⁻² | $_{20}b_{2-1}$ = −1.17816 × 10⁻⁴ |
| $_{00}b_{20}$ = −5.43737 × 10⁻⁷ | $_{20}b_{20}$ = 9.97124 × 10⁻⁷ |
| $_{00}b_{21}$ = −7.98055 × 10⁻¹⁰ | $_{20}b_{21}$ = −1.90934 × 10⁻¹⁰ |
| $_{00}b_{3-1}$ = −6.32142 × 10⁻⁵ | $_{20}b_{3-1}$ = 6.07171 × 10⁻⁷ |
| $_{00}b_{30}$ = −5.07617 × 10⁻⁸ | $_{20}b_{30}$ = −1.39154 × 10⁻⁹ |
| $_{00}b_{31}$ = 7.33230 × 10⁻¹² | $_{20}b_{31}$ = 1.09570 × 10⁻¹² |
| $_{01}b_{0-1}$ = 5.39853 × 10⁻² | $_{21}b_{0-1}$ = −7.83348 × 10⁻³ |
| $_{01}b_{00}$ = −1.15261 × 10⁻² | $_{21}b_{00}$ = 9.66035 × 10⁻⁵ |
| $_{01}b_{01}$ = 1.02897 × 10⁻⁷ | $_{21}b_{01}$ = −6.81388 × 10⁻⁹ |
| $_{01}b_{1-1}$ = −5.88806 × 10⁻³ | $_{21}b_{1-1}$ = 4.63538 × 10⁻⁴ |
| $_{01}b_{10}$ = 4.22937 × 10⁻⁴ | $_{21}b_{10}$ = −4.86365 × 10⁻⁶ |
| $_{01}b_{11}$ = −6.83787 × 10⁻⁹ | $_{21}b_{11}$ = 4.22758 × 10⁻¹⁰ |
| $_{01}b_{2-1}$ = −1.31341 × 10⁻⁴ | $_{21}b_{2-1}$ = −8.71871 × 10⁻⁶ |
| $_{01}b_{20}$ = 4.99035 × 10⁻⁶ | $_{21}b_{20}$ = 5.55889 × 10⁻⁸ |
| $_{01}b_{21}$ = 1.13793 × 10⁻¹⁰ | $_{21}b_{21}$ = −7.25739 × 10⁻¹² |
| $_{01}b_{3-1}$ = −6.36666 × 10⁻⁷ | $_{21}b_{3-1}$ = 4.44998 × 10⁻⁸ |
| $_{01}b_{30}$ = 2.03401 × 10⁻⁸ | $_{21}b_{30}$ = −1.94420 × 10⁻¹⁰ |
| $_{01}b_{31}$ = 5.81317 × 10⁻¹³ | $_{21}b_{31}$ = 3.88384 × 10⁻¹⁴ |
| $_{02}b_{0-1}$ = −4.25322 × 10⁻¹ | $_{22}b_{0-1}$ = 4.94371 × 10⁻⁴ |
| $_{02}b_{00}$ = 1.10636 × 10⁻³ | $_{22}b_{00}$ = −1.04438 × 10⁻⁴ |
| $_{02}b_{01}$ = −1.00001 × 10⁻⁷ | $_{22}b_{01}$ = −3.45645 × 10⁻⁹ |
| $_{02}b_{1-1}$ = 2.36392 × 10⁻² | $_{22}b_{1-1}$ = −3.92619 × 10⁻⁵ |
| $_{02}b_{10}$ = −9.54106 × 10⁻⁵ | $_{22}b_{10}$ = 5.49545 × 10⁻⁶ |
| $_{02}b_{11}$ = 5.49364 × 10⁻⁹ | $_{22}b_{11}$ = 1.91415 × 10⁻¹⁰ |
| $_{02}b_{2-1}$ = −4.72316 × 10⁻⁴ | $_{22}b_{2-1}$ = 7.97269 × 10⁻⁷ |
| $_{02}b_{20}$ = −2.35301 × 10⁻⁷ | $_{22}b_{20}$ = −7.48773 × 10⁻⁸ |
| $_{02}b_{21}$ = −9.93911 × 10⁻¹¹ | $_{22}b_{21}$ = −2.93468 × 10⁻¹² |
| $_{02}b_{3-1}$ = 2.28178 × 10⁻⁶ | $_{22}b_{3-1}$ = −3.37678 × 10⁻⁹ |
| $_{02}b_{30}$ = 1.05998 × 10⁻⁸ | $_{22}b_{30}$ = 3.00611 × 10⁻¹⁰ |
| $_{02}b_{31}$ = 7.46382 × 10⁻¹³ | $_{22}b_{31}$ = 1.26185 × 10⁻¹⁴ |

By using these values of the intrinsic constant $_{ij}b_{km}$, not only the values of the state constant $a_{ij}$ which correspond to FIGS. 19(A)(i) to 19(A)(iii), 19(B)(i) to 19(B)(iii) and 19(C)(i) to 19(C)(iii) but also the values of the state constant $a_{ij}$ for any desired combination of the focal length "f" and the focusable object distance "s" can be computed in accordance with the formula (6).

In the case of the seventh embodiment, each state constant $a_{ij}$ is expressed as a cubical power series for the focal length "f" and as a sum of three powers of negative first degree, zero degree and first degree for the object distance "s". Since there is a primary term related to the focusable object distance "s", in the case of the seventh embodiment, the focusable object distance "s" includes values up to an infinity distance value which is, for example, 10000 cm. Since the number of terms related to the focal length "f" is 4, the number of terms related to the focusable object distance "s" is 3 and the number of state constants for each state is 6, the correction value for an arbitrary state can be computed by using a total of 72(=4×3×6) intrinsic constants.

In a case where the states of combining the focal length "f" and the object distance "s" are considered, like in the case of the seventh embodiment, adoption of a method of dividing each of these states into a plurality of areas tends to necessitate keeping an innumerably large number of constants in a storage device. Therefore, in that case, the advantageous effect of the arrangement of the invention becomes more conspicuous.

The values of the state constant $a_{ij}$ which can be obtained by the formula (6) and correspond to FIGS. 19(A)(i) to 19(A)(iii), 19(B)(i) to 19(B)(iii) and 19(C)(i) to 19(C)(iii) are as shown below:

Fig. 19 (A) (i)

$a_{00} = 6.52088 \times 10^{-2}$  $a_{01} = -3.38456 \times 10^{-3}$  $a_{02} = -3.18985 \times 10^{-3}$
$a_{20} = 3.79736 \times 10^{-4}$  $a_{21} = -1.48921 \times 10^{-5}$  $a_{22} = -1.77876 \times 10^{-6}$

Fig. 19 (A) (ii)

$a_{00} = 3.45214 \times 10^{-2}$  $a_{01} = -3.11451 \times 10^{-3}$  $a_{02} = -2.18007 \times 10^{-3}$
$a_{20} = 4.18502 \times 10^{-4}$  $a_{01} = -6.95346 \times 10^{-6}$  $a_{22} = -1.08757 \times 10^{-6}$

Fig. 19 (A) (iii)

$a_{00} = 1.77211 \times 10^{-2}$  $a_{01} = -3.09873 \times 10^{-3}$  $a_{02} = -1.66981 \times 10^{-3}$
$a_{20} = 4.53865 \times 10^{-4}$  $a_{21} = 3.83127 \times 10^{-7}$  $a_{22} = -1.33389 \times 10^{-6}$

Fig. 19 (B) (i)

$a_{00} = 2.83752 \times 10^{-1}$  $a_{01} = 1.76466 \times 10^{-3}$  $a_{02} = -8.72790 \times 10^{-3}$
$a_{20} = -2.06052 \times 10^{-3}$  $a_{21} = -9.01901 \times 10^{-5}$  $a_{22} = 2.62943 \times 10^{-5}$

Fig. 19 (B) (ii)

$a_{00} = 1.18495 \times 10^{-1}$  $a_{01} = 9.98550 \times 10^{-4}$  $a_{02} = -5.16203 \times 10^{-3}$
$a_{20} = -1.08673 \times 10^{-3}$  $a_{21} = -5.70560 \times 10^{-5}$  $a_{22} = 2.06361 \times 10^{-5}$

Fig. 19 (B) (iii)

$a_{00} = 1.50404 \times 10^{-2}$  $a_{01} = 3.83031 \times 10^{-4}$  $a_{02} = -2.66758 \times 10^{-3}$
$a_{20} = -3.75876 \times 10^{-4}$  $a_{21} = -3.26678 \times 10^{-5}$  $a_{22} = 1.69464 \times 10^{-5}$

Fig. 19 (C) (i)

$a_{00} = 4.12733 \times 10^{-1}$  $a_{01} = 4.07184 \times 10^{-3}$  $a_{02} = -9.78182 \times 10^{-3}$
$a_{20} = -2.25168 \times 10^{-3}$  $a_{21} = -1.07082 \times 10^{-4}$  $a_{22} = 1.95118 \times 10^{-5}$

Fig. 19 (C) (ii)

$a_{00} = 1.53070 \times 10^{-1}$  $a_{01} = 2.28356 \times 10^{-3}$  $a_{02} = -3.47714 \times 10^{-3}$
$a_{20} = -5.65797 \times 10^{-4}$  $a_{21} = -5.63192 \times 10^{-5}$  $a_{22} = 4.59993 \times 10^{-6}$

Fig. 19 (C) (iii)

$a_{00} = 2.86132 \times 10^{-3}$  $a_{01} = 1.00733 \times 10^{-3}$  $a_{02} = 2.18201 \times 10^{-3}$
$a_{20} = 1.30905 \times 10^{-3}$  $a_{21} = -8.59663 \times 10^{-6}$  $a_{22} = -1.42778 \times 10^{-5}$ The embodiments have been described by way of example above on the assumption that variations in aberration of the photo-taking lens are caused by the focal length and the focusable object distance. However, other conceivable causes for variations in aberration include the diaphragm of the photo-taking lens. The correction can be accomplished also with respect to the diaphragm in the same manner as the arrangement of the embodiments described above. More specifically, in that case, the correction can be made by keeping intrinsic constants indicative of the lens characteristics relative to changes of aperture, and by detecting, with a lens state detecting means, a photo-taking aperture value decided on the basis of information inputted from outside and information from a light measuring system disposed within the camera body.

In cases where the variations in state of photo-taking lenses bring about changes in aberration to such an extent that affects focus detection, the invention is applicable to such cases in general as long as such variations of states are detectable. Further, in a case where there are a plurality of such state variations that must be noted, correction can be accurately carried out according to the invention by keeping in a storage device a limited number of intrinsic constants for a combination of two or three or more of such state variations.

We claim:

1. A focus detecting device comprising:
   a) a sensor part having light receiving areas arranged on a two-dimensional base for receiving a light flux having passed through an objective lens; and
   b) computing means for computing a correction value for a predetermined area of said sensor part by using, as variables for computation, two parameters indicative of a position of the predetermined area and for computing a focusing state according to an output from the predetermined area of said sensor part and the correction value.

2. A focus detecting device according to claim 1, wherein said computing means obtains correction values for a plurality of areas of said sensor part by using, as variables for computation, parameters indicative of a position of each of the plurality of areas.

3. A focus detecting device according to claim 2, wherein said computing means uses, as the parameters, data indicative of coordinates related to the position of each of the plurality of areas of said sensor part.

4. A focus detecting device according to claim 1, wherein, with an area of said sensor part where a light flux from an optical axis of said objective lens is received used as a center coordinate position, said computing means uses coordinate values of other areas as the parameters.

5. A focus detecting device according to claim 1, wherein the correction value is computed by said computing means by using predetermined data as coefficients and also using functions which have the parameters as variables.

6. A focus detecting device according to claim 1, wherein data used for computing the correction value is stored in a memory provided within a lens unit which is mounted on a camera, the data stored in said memory is transmitted to said camera, and the correction value is computed by said computing means within said camera by using the data and the parameters.

7. A focus detecting device according to claim 6, wherein the data is predetermined coefficient data, and said computing means computes the correction value by using the data as coefficients and also by using functions which have the parameters as variables.

8. A focus detecting device comprising:
   a) focusing state detecting means for obtaining a signal related to a focusing state of an objective lens for a predetermined area of a prescribed focal plane, and for detecting the focusing state for the predetermined area on the basis of the signal related to the focusing state and a signal related to correction; and
   b) correction signal forming means for obtaining the signal related to correction for the predetermined area of the prescribed focal plane by performing a predetermined computing process using at least two parameters set correspondingly with a position of the predetermined area.

9. A focus detecting device according to claim 8, wherein said correction signal forming means obtains, by performing a computing operation using as variables two parameters indicative of a position of each area of a sensor part having a plurality of light receiving areas arranged on a two-dimensional base for receiving a light flux having passed through said objective lens, the signal related to correction for each area of said sensor part, and said focusing state detecting means detects the focusing state for each area of said sensor part on the basis of the signal related to the focusing state for each area and the signal related to correction for each area.

10. A focus detecting device according to claim 8, wherein said focusing state detecting means includes a secondary image forming lens composed of at least one pair of lens elements and sensors respectively corresponding to said lens elements, and detects the focusing state of said objective lens from a relation between relative positions of corresponding parts of two light-quantity distributions formed on said sensors.

11. A focus detecting device according to claim 10, wherein said focusing state detecting means has no rotational symmetry with respect to an optical axis of said objective lens or to an axis optically equivalent to the optical axis of said objective lens.

12. A focus detecting device according to claim 8, wherein the parameters are two-dimensional coordinate values for a coordinate system defined on the prescribed focal plane or a plane equivalent to the prescribed focal plane.

13. A focus detecting device according to claim 8, wherein the predetermined computing process is an arithmetic operation on a predetermined function using the parameters as variables.

14. A focus detecting device according to claim 8, wherein said objective lens is disposed in an interchangeable lens unit mounted on a camera, and said focusing state detecting means is disposed in the camera.

15. A focus detecting device according to claim 14, wherein said correction signal forming means is disposed in the camera.

16. A focus detecting device according to claim 14, wherein said correction signal forming means is disposed in the interchangeable lens unit.

17. A focus detecting device according to claim 8, wherein the predetermined area of the prescribed focal plane of said objective lens is divided into a plurality of partial areas, and the at least two parameters are set correspondingly with a position of each of the partial areas.

18. A focus detecting device according to claim 17, wherein the parameters are a plurality of values determined by coordinate values of the center of each of the partial areas.

19. A camera system equipped with a focus detecting device which has a sensor part having a plurality of light receiving areas arranged on a two-dimensional base for receiving a light flux having passed through an objective lens and detects a focusing state of said objective lens for each of the light receiving areas on the basis of an output from each area of said sensor part, said camera system comprising:

a) a computing circuit which performs an arithmetic operation on preset data with two parameters indicative of each area of said sensor part used as variables, to obtain a correction value for each area; and b) a focusing state computing circuit which obtains the focusing state of said objective lens for each area of said sensor part in accordance with the output from each area of said sensor part and the correction value obtained for the area.

20. A camera system equipped with a focus detecting device which has a sensor part having a plurality of light receiving areas arranged on a two-dimensional base for receiving a light flux having passed through an objective lens and detects a focusing state of said objective lens for each of the light receiving areas on the basis of an output from each area of said sensor part, said camera system comprising:

a) a memory disposed in a lens barrel to store data;

b) a computing circuit which performs an arithmetic operation on the data stored in said memory with two parameters indicative of each area of said sensor part used as variables, to obtain a correction value for each area; and c) a focusing state computing circuit which obtains the focusing state of said objective lens for each area of said sensor part in accordance with the output from each area of said sensor part and the correction value obtained for the area.

21. A camera system according to claim 20, wherein said computing circuit performs the arithmetic operation using, as the parameters, coordinate values of two directions indicative of a position of each area of said sensor part.

22. An interchangeable lens unit adapted for a camera system equipped with a focus detecting device which has a sensor part having a plurality of light receiving areas arranged on a two-dimensional base for receiving a light flux having passed through an objective lens and detects a focusing state of said objective lens for each of the light receiving areas in accordance with an output from each area of said sensor part and a correction value obtained for the area by performing an arithmetic operation on data with two parameters indicative of each area of said sensor part used as variables, said interchangeable lens unit comprising:

a) a memory disposed in a lens barrel to store said data.

23. A focus detecting device comprising:

a) focus detecting means for obtaining a signal related to a focusing state of an objective lens for each of a plurality of areas on a prescribed focal plane of said objective lens;

b) storage means for storing an intrinsic constant indicative of an intrinsic characteristic of said objective lens;

c) lens state detecting means for detecting a state of said objective lens;

d) state constant computing means for computing a state constant which corresponds to the state of said objective lens by using the intrinsic constant and a first computing procedure which includes a first parameter obtained by said lens state detecting means;

e) correction value computing means for obtaining a signal related to correction to be made in detecting focus on each of the areas by using the state constant and a second computing procedure which includes a second parameter set for each area of the prescribed focal plane; and f) correction computing means for computing the focusing state of said objective lens on the basis of the signal related to the focusing state and the signal related to the correction.

24. A focus detecting device according to claim 23, wherein said objective lens is capable of varying a focal length by moving all or part of lens elements constituting said objective lens, and said lens state detecting means detects a moving state of the moving lens element of said objective lens or an amount characterizing the moving state.

25. A focus detecting device according to claim 23, wherein said objective lens is capable of focusing on objects located at predetermined distances by moving a focusing lens composed of all or part of lens elements constituting said objective lens, and said lens state detecting means detects a moving state of the focusing lens or an amount characterizing the moving state.

26. A focus detecting device according to claim 23, wherein said objective lens has a diaphragm an aperture diameter of which is variable during photography or observation, and said lens state detecting means detects the aperture diameter of said diaphragm of said objective lens or an amount characterizing the aperture diameter of said diaphragm.

27. A focus detecting device according to claim 23, wherein said focus detecting means includes a secondary image forming lens composed of at least one pair of lens elements and sensors respectively corresponding to said lens elements, and detects the focusing state of said objective lens from a relation between relative positions of corresponding parts of light-quantity distributions related to two object images formed on said sensors.

28. A focus detecting device according to claim 27, wherein said focus detecting means has no rotational symmetry with respect to an optical axis of said objective lens or to an axis optically equivalent to the optical axis of said objective lens.

29. A focus detecting device according to claim 23, wherein said first parameter includes at least one of values which characterize a focal length of said objective lens, a moving state of a focusing lens and an aperture diameter of a diaphragm.

30. A focus detecting device according to claim 23, wherein the first computing procedure is an arithmetic operation on a predetermined function determined by a characteristic of said objective lens with the first parameter used as a variable.

31. A focus detecting device according to claim 23, wherein the second parameter is two-dimensional coordinate values for a coordinate system defined on the prescribed focal plane or a plane equivalent to the prescribed focal plane.

32. A focus detecting device according to claim 23, wherein the second computing procedure is an arithmetic operation on a predetermined function determined by a characteristic of said objective lens with the second parameter used as a variable.

33. A focus detecting device according to claim 23, wherein said objective lens is arranged to be detachable from a camera body which includes said focus detecting means.

34. A focus detecting device according to claim 33, wherein said objective lens is one of interchangeable objective lenses of a plurality of kinds which are selectively mountable on said camera body.

35. A focus detecting device according to claim 34, wherein said correction value computing means is disposed in said camera body.

36. A focus detecting device according to claim 34, wherein said correction value computing means is disposed in said objective lens.

37. A focus detecting device according to claim 34, wherein said state constant computing means is disposed in said camera body.

38. A focus detecting device according to claim 34, wherein said state constant computing means is disposed in said objective lens.

* * * * *

UNITED STATES PATENT AND TRADEMARK OFFICE
CERTIFICATE OF CORRECTION

PATENT NO. : 6,088,537
DATED : July 11, 2000
INVENTOR(S) : Keiji Ohtaka, et al

Page 1 of 1

It is certified that error appears in the above-identified patent and that said Letters Patent is hereby corrected as shown below:

Column 4,
Line 22, delete "distance e" and insert -- distance --.
Line 25, delete "distance 1" and insert -- distance --.

Column 5,
Line 66, before "17(B)" insert -- 17(A) --.

Column 9,
Line 64, delete "value C a and" and insert -- value C and --.

Column 15,
Line 43, delete "(x,Y)" and insert -- (x,y) --.

Column 18,
Line 42, delete "4.22937" and insert -- 4.22987 --.
Line 48, delete '5.81317" and insert -- -5.81817 --.

Signed and Sealed this

Eleventh Day of September, 2001

Attest:

*Nicholas P. Godici*

NICHOLAS P. GODICI
*Attesting Officer*  *Acting Director of the United States Patent and Trademark Office*